US008438164B2

(12) United States Patent
Hull et al.

(10) Patent No.: US 8,438,164 B2
(45) Date of Patent: May 7, 2013

(54) TECHNIQUES FOR TARGETING INFORMATION TO USERS

(75) Inventors: Jonathan J. Hull, San Carlos, CA (US);
Jamey Graham, San Jose, CA (US);
Peter Hart, Menlo Park, CA (US); Kurt Piersol, Santa Cruz, CA (US)

(73) Assignee: Ricoh Co., Ltd., Tokyo (JP)

( * ) Notice: Subject to any disclaimer, the term of this patent is extended or adjusted under 35 U.S.C. 154(b) by 909 days.

(21) Appl. No.: 11/773,894

(22) Filed: Jul. 5, 2007

(65) Prior Publication Data
US 2008/0005102 A1 Jan. 3, 2008

Related U.S. Application Data

(63) Continuation of application No. 09/905,036, filed on Jul. 12, 2001, now Pat. No. 7,257,589, which is a continuation-in-part of application No. 09/636,039, filed on Aug. 9, 2000, now abandoned, and a continuation-in-part of application No. 09/483,092, filed on Jan. 14, 2000, now Pat. No. 6,804,659, and a continuation-in-part of application No. 09/483,094, filed on Jan. 14, 2000, now abandoned, and a continuation-in-part of application No. 08/995,616, filed on Dec. 22, 1997, now abandoned.

(51) Int. Cl.
*G06F 7/00* (2006.01)
(52) U.S. Cl.
USPC .......................................... 707/738; 707/749
(58) Field of Classification Search .................. 707/101, 707/104.1, 749, 738
See application file for complete search history.

(56) References Cited

U.S. PATENT DOCUMENTS

| 4,417,239 A | 11/1983 | Demke et al. |
| 4,823,303 A | 4/1989 | Terasawa |
| 5,105,184 A | 4/1992 | Pirani et al. |
| 5,153,831 A | 10/1992 | Yianilos |
| 5,297,042 A | 3/1994 | Morita |
| 5,309,359 A | 5/1994 | Katz et al. |
| 5,339,391 A | 8/1994 | Wroblewski et al. |
| 5,349,658 A | 9/1994 | O'Rourke et al. |

(Continued)

FOREIGN PATENT DOCUMENTS

| DE | 198 59 180 A1 | 12/1998 |
| EP | 378 848 A2 | 7/1990 |

(Continued)

OTHER PUBLICATIONS

Adobe Acrobat Reader 3.0 screen dumps (1996).
AdobeAcrobat® 4.0 Classroom in a Book®, second edition, Lesson 10, Creating PDF Documents from Paper and the Web, pp. 1-12, Adobe Press (2000).
Adobe Systems, Inc., "Adobe Photoshop 4.0 User Guide for Macintosh and Windows," Title Page, Copyright Page, Chap. 2, pp. 30-31 (1996).

(Continued)

*Primary Examiner* — James Trujillo
*Assistant Examiner* — Linh Black
(74) *Attorney, Agent, or Firm* — Kilpatrick Townsend & Stockton LLP

(57) ABSTRACT

Techniques for providing relevant information to a user based on information or documents accessed or viewed by the user. The relevant information is provided automatically to the user without requiring user input. The information provided to the user is selected from information provided by various content provider systems. The present invention uses several techniques to determine relevancy between the contents of the document accessed by the user and between the information provided by the content provider systems. The relevancy information is used to select information to be provided to the user.

17 Claims, 11 Drawing Sheets

U.S. PATENT DOCUMENTS

| | | | |
|---|---|---|---|
| 5,384,703 A | 1/1995 | Withgott et al. | |
| 5,401,946 A | 3/1995 | Weinblatt | |
| 5,404,295 A | 4/1995 | Katz et al. | |
| 5,418,948 A | 5/1995 | Turtle | |
| 5,442,795 A | 8/1995 | Levine et al. | |
| 5,479,600 A | 12/1995 | Wroblewski et al. | |
| 5,481,666 A | 1/1996 | Nguyen et al. | |
| 5,530,942 A | 6/1996 | Tzou et al. | |
| 5,546,502 A | 8/1996 | Hart et al. | |
| 5,557,794 A | 9/1996 | Matsunaga et al. | |
| 5,596,700 A | 1/1997 | Darnell et al. | |
| 5,638,543 A | 6/1997 | Pedersen et al. | |
| 5,680,636 A | 10/1997 | Levine et al. | |
| 5,694,559 A | 12/1997 | Hobson et al. | |
| 5,717,914 A * | 2/1998 | Husick et al. | 1/1 |
| 5,721,897 A | 2/1998 | Rubinstein et al. | |
| 5,721,902 A | 2/1998 | Schultz | |
| 5,724,521 A | 3/1998 | Dedrick | |
| 5,737,599 A | 4/1998 | Rowe et al. | |
| 5,742,768 A | 4/1998 | Gennaro et al. | |
| 5,748,805 A | 5/1998 | Withgott et al. | |
| 5,751,283 A | 5/1998 | Smith | |
| 5,751,287 A | 5/1998 | Hahn et al. | |
| D395,297 S | 6/1998 | Cheng et al. | |
| 5,761,655 A | 6/1998 | Hoffman | |
| 5,768,578 A | 6/1998 | Kirk et al. | |
| 5,778,363 A | 7/1998 | Light | |
| 5,778,397 A | 7/1998 | Kupiec et al. | |
| 5,781,785 A | 7/1998 | Rowe et al. | |
| 5,784,616 A | 7/1998 | Horvitz | |
| D398,299 S | 9/1998 | Ballay et al. | |
| 5,806,079 A | 9/1998 | Rivette et al. | |
| D400,195 S | 10/1998 | Utesch | |
| 5,818,446 A | 10/1998 | Bertram et al. | |
| 5,819,301 A | 10/1998 | Rowe et al. | |
| 5,822,731 A * | 10/1998 | Schultz | 704/270.1 |
| D400,520 S | 11/1998 | Baker et al. | |
| 5,832,474 A | 11/1998 | Lopresti et al. | |
| 5,838,317 A | 11/1998 | Bolnick et al. | |
| 5,838,323 A | 11/1998 | Rose et al. | |
| 5,845,278 A * | 12/1998 | Kirsch et al. | 707/688 |
| 5,847,709 A | 12/1998 | Card et al. | |
| 5,855,008 A | 12/1998 | Goldhaber et al. | |
| 5,857,185 A | 1/1999 | Yamaura | |
| 5,860,074 A | 1/1999 | Rowe et al. | |
| 5,870,770 A | 2/1999 | Wolfe | |
| 5,873,076 A * | 2/1999 | Barr et al. | 1/1 |
| 5,873,107 A | 2/1999 | Borovoy et al. | |
| 5,903,889 A | 5/1999 | De La Huerga et al. | |
| 5,915,250 A | 6/1999 | Jain et al. | |
| 5,933,841 A | 8/1999 | Schumacher et al. | |
| 5,943,679 A | 8/1999 | Niles et al. | |
| 5,946,678 A | 8/1999 | Aalbersberg | |
| 5,948,061 A | 9/1999 | Merriman et al. | |
| 5,950,187 A | 9/1999 | Tsuda | |
| 5,987,454 A | 11/1999 | Hobbs | |
| 6,006,197 A | 12/1999 | d'Eon et al. | |
| 6,006,218 A | 12/1999 | Breese et al. | |
| D418,826 S | 1/2000 | Pavely et al. | |
| D419,144 S | 1/2000 | Baker et al. | |
| 6,011,537 A | 1/2000 | Slotznick | |
| 6,012,053 A | 1/2000 | Pant et al. | |
| 6,016,494 A | 1/2000 | Isensee et al. | |
| 6,021,403 A | 2/2000 | Horvitz et al. | |
| 6,026,409 A | 2/2000 | Blumenthal | |
| 6,028,601 A | 2/2000 | Machiraju et al. | |
| 6,029,195 A | 2/2000 | Herz | |
| 6,044,376 A | 3/2000 | Kurtzman, II | |
| 6,055,542 A | 4/2000 | Nielsen et al. | |
| D424,036 S | 5/2000 | Arora et al. | |
| D425,039 S | 5/2000 | Shields | |
| D425,497 S | 5/2000 | Eisenberg et al. | |
| 6,057,839 A | 5/2000 | Advani et al. | |
| 6,067,552 A | 5/2000 | Yu | |
| 6,070,176 A | 5/2000 | Downs et al. | |
| 6,085,186 A * | 7/2000 | Christianson et al. | 707/3 |
| 6,085,202 A | 7/2000 | Rao et al. | |
| 6,094,648 A | 7/2000 | Aalbersberg et al. | |
| 6,101,503 A | 8/2000 | Cooper et al. | |
| 6,119,114 A * | 9/2000 | Smadja | 1/1 |
| 6,131,092 A | 10/2000 | Masand | |
| 6,133,916 A | 10/2000 | Bukszar et al. | |
| D435,561 S | 12/2000 | Pettigrew et al. | |
| 6,177,931 B1 | 1/2001 | Alexander et al. | |
| 6,177,936 B1 | 1/2001 | Cragun | |
| 6,182,090 B1 | 1/2001 | Peairs | |
| 6,185,614 B1 | 2/2001 | Cuomo et al. | |
| D439,585 S | 3/2001 | Law et al. | |
| 6,222,547 B1 | 4/2001 | Schwuttke et al. | |
| D445,802 S | 7/2001 | Greminger | |
| 6,259,458 B1 | 7/2001 | Theisen et al. | |
| 6,263,351 B1 | 7/2001 | Wolfe | |
| 6,263,507 B1 * | 7/2001 | Ahmad et al. | 725/134 |
| 6,269,361 B1 | 7/2001 | Davis et al. | |
| 6,275,229 B1 | 8/2001 | Weiner et al. | |
| 6,275,829 B1 | 8/2001 | Angiulo et al. | |
| 6,289,361 B1 | 9/2001 | Uchida | |
| D449,050 S | 10/2001 | Graham | |
| 6,313,855 B1 | 11/2001 | Shuping et al. | |
| 6,326,957 B1 | 12/2001 | Nathan et al. | |
| 6,335,730 B1 | 1/2002 | Gould | |
| 6,339,437 B1 | 1/2002 | Nielsen | |
| 6,369,811 B1 | 4/2002 | Graham et al. | |
| D456,817 S | 5/2002 | Graham | |
| 6,415,278 B1 | 7/2002 | Sweet et al. | |
| 6,415,320 B1 | 7/2002 | Hess et al. | |
| 6,421,070 B1 | 7/2002 | Ramos et al. | |
| 6,434,567 B1 | 8/2002 | De La Huerga | |
| 6,457,026 B1 | 9/2002 | Graham et al. | |
| 6,460,036 B1 | 10/2002 | Herz | |
| 6,507,837 B1 | 1/2003 | De La Huerga | |
| 6,516,321 B1 | 2/2003 | De La Huerga | |
| 6,553,373 B2 | 4/2003 | Boguraev et al. | |
| 6,582,475 B2 | 6/2003 | Graham et al. | |
| 6,647,534 B1 | 11/2003 | Graham | |
| 6,681,370 B2 | 1/2004 | Gounares et al. | |
| 6,804,659 B1 | 10/2004 | Graham et al. | |
| 6,820,094 B1 * | 11/2004 | Ferguson et al. | 707/200 |
| 6,956,593 B1 | 10/2005 | Gupta et al. | |
| 7,124,093 B1 | 10/2006 | Graham et al. | |
| 7,228,492 B1 | 6/2007 | Graham | |
| 7,257,589 B1 | 8/2007 | Graham et al. | |
| 2002/0029232 A1 | 3/2002 | Bobrow et al. | |
| 2002/0065814 A1 | 5/2002 | Okamoto et al. | |
| 2003/0051214 A1 | 3/2003 | Graham et al. | |
| 2004/0059708 A1 | 3/2004 | Dean et al. | |
| 2006/0122884 A1 | 6/2006 | Graham et al. | |

FOREIGN PATENT DOCUMENTS

| | | |
|---|---|---|
| EP | 459 174 A2 | 12/1991 |
| EP | 737 927 A2 | 10/1996 |
| EP | 762 297 A2 | 3/1997 |
| EP | 802 492 A1 | 10/1997 |
| EP | 926 614 A2 | 6/1999 |
| GB | 2137788 A | 10/1984 |
| GB | 2156118 A | 10/1985 |
| GB | 2234609 A | 2/1991 |
| GB | 2290898 A | 1/1996 |
| GB | 2 332 544 A | 6/1999 |
| JP | 02-001057 | 1/1990 |
| JP | 05-081327 A | 4/1993 |
| JP | 06-203024 | 7/1994 |
| JP | 08-255163 | 10/1996 |
| JP | 8-297677 A | 11/1996 |
| JP | 11-213011 | 8/1999 |
| WO | WO 97/12328 A1 | 4/1993 |
| WO | WO 97/22074 A1 | 6/1997 |

OTHER PUBLICATIONS

Adobe Systems Incorporated, Acrobat Reader, 1999, Adobe Systems Incorporated, Version 4.0.

Amati et al., "A Framework for Filtering News and Managing Distributed Data," *J. Universal Comp. Sci.*, 3(8):1007-1021 (1997).

Apple computer, Inc., "Getting Help" and "Turning Balloon Help" Macintosh Data Book, Reference 7 System, in Chapter 1 entitled "A Review of Standard Macintosh Operations," pp. 30-31 (1991).

Photoshoot 4.0, pp. 30-31.

Balasubramanian, V., *State of the Art Review on Hypermedia Issues and Applications*, chapter 5—Information Retrieval Issues, E-Papyrus, Inc., Apr. 1998 (downloaded from website on Dec. 15, 2004) on the internet: <http://www.e-papyrus.com/hypertext_review/index.html>.

Ball et al., "Software Visualization in the Large," *IEEE Computer*, 29(4): 33-43, Apr. 1996. http://www.computer.org/computer/co1996/r4033abs.htm.

Begole et al., "Flexible Collaboration Transparency," doc. ID: ncstrl.vatech_cs/TR-98-11, Virginia Polytechnic Insitute and State University (1998).

Begole et al., "Supporting Worker Independence in Collaboration Transparency," doc. ID: ncstrl.vatech_cs/TR-98-12, Virginia Polytechnic Institute and State University (1998).

Boguraev et al., *Salience-Based Content Characterisation of Text Documents*, In Proceedings of the ACL/EACL Workshop on Intelligent [Sic] Scalable Text Summarization, 1997. Topic identification, Discourse-based summarization. pp. 1-12.

Brandow et al., "Automatic Condensation of Electronic Publications by Sentence Selection," *Information Processing and Management*, 31(5):675-685 (1995).

Byrd, D., "A Scrollbar-based Visualization for Document Navigation," doc. ID: xxx.cs.IR/9902028, Computing Research Repository Information Retrieval (1999).

Communication mailed Aug. 14, 2007, received from the Japanese Patent Office in Japanese Application 11-195547.

Communication mailed Aug. 21, 2007, received from the Japanese Patent Office in Japanese Application 2006-012042.

"Flexible JAMM Screenshots," downloaded from internet site http://simon.cs.ct.edu/-jamm May 4, 2000.

Gliedman, J., "Virtual Office Managers," *Computer Shopper*, 18(9):290 (1998).

"Google Advertising Programs, For Advertisers: Google AdWords; For Web Publishers: Google AdSense," downloaded from http://www.google.com/intl/en/ads/index.html on Sep. 8, 2005.

Greenberg et al., (1995) *Sharing fisheye views in relaxed-WYSIWIS groupware applications*, Proceedings of Graphics Interface, Toronto, Canada, May 22-24, Distributed by Morgan-Kaufmann, pp. 28-38, http://www.cpsc.ucalgary.ca/grouplab/papers/1996/96-Fisheye.GI/gi96 fisheye.html.

Hart et al., "Query-Free Information Retrieval,", IEEE Cooperative Information Systems, pp. 32-37, Oct. 1997.

Hearst, M., *TileBars: Visualization of Term Distribution Information in Full Text Information Access*, Proceedings of the ACM SIGCHI Conference on Human Factors in Computing Systems (CHI), Denver, CO., May 1995, pp. 1-8, http://www.acm.org/sigchi/chi95/Electronic/documnts/papers/mah bdy htm.

Hill et al. "Edit Wear and Read Wear," Computer Graphics and Interactive Media Research Group, pp. 3-9, (May 1992).

IBM Technical Disclosure Bulletin, "Quick Selection of Window Environment Coordinates," 35:57-60, ISS # 4B, (1992).

Lam et al. "Automatic document classification based on probabilistic reasoning: model and performance analysis," *IEEE*, 3:2719-2723 (1997).

Langley, P., "An Analysis of Bayesian Classifiers," *Proceedings of 10th National Conference on Artificial Intelligence*, pp. 223-228, (1992).

Langley, P., "Induction of Selective Bayesian Classifiers," *Proceedings of 10th National Conference on Uncertainty in Artificial Intelligence*, pp. 400-406 (1994).

Manber, U., "The Use of Customized Emphasis in Text Visualization," *1997 IEEE Conf. on Info. Visualization*, London, England, pp. 132-138 (1997).

Office Action for German Patent 198 59 180 dated Nov. 5, 2003.

Office Action from related Japanese application.

Schweighofer et al., "The automatic Generation of Hypertext Links in Legal Documents," from *Lecture Notes in Computer Science 1134*, 7th International Conference, DEXA '96, Zurich, Switzerland, pp. 889-898 (1996).

Combined Search and Examination Report for GB 9827135.6 dated Jan. 27, 1999 (reported out Jan. 28, 1999).

Search Report for GB 9827135.6 dated Jan. 11, 2000.(reported out Jan. 13, 2000).

Shneiderman, B., "Dynamic Queries for Visual Information Seeking," pp. 236-243 from *Readings in Information Visualization, Using Vision to Think*, Card et al., Eds., Morgan Kaufman Publishers, Jan. 25, 1999.

Sumita et al., "Document Structure Extraction for Interactive Document Retrieval Systems," *Proceedings of SIGDOC '93*, Getting in Touch—Staying in Touch, pp. 301-310 (1993).

Taghva et al., "An Evaluation of an Automatic Markup System," *SPIE*, 2422:317-327 (1995).

Taxt, T., "Segmentation of Document Images," *IEEE*, 11(12):1322-1329 (1989).

"c:\...\9149920c.wpd—unmodified" Screen Shots of document created in Corel WordPerfect, 4 pages, (Apr. 30, 2002).

Dialog Accession No. 04720812 "Web Wide Media Revolutionizes Online Advertising Industry," PR Newswire, p1205NYTH040, Dec. 5, 1996.

U.S. Appl. No. 09/483,094, filed Jan. 14, 2000, Graham.

Non-Final Office Action for U.S. Appl. No. 09/149,920, mailed on May 12, 2000.

Final Office Action for U.S. Appl. No. 09/149,920, mailed on Jan. 31, 2001.

Non-Final Office Action for U.S. Appl. No. 09/149,920, mailed on Oct. 23, 2001.

Final Office Action for U.S. Appl. No. 09/149,920, mailed on May 8, 2002.

Advisory Action for U.S. Appl. No. 09/149,920, mailed on Sep. 10, 2002.

Notice of Allowance for U.S. Appl. No. 09/149,920, mailed on Dec. 31, 2002.

Non-Final Office Action for U.S. Appl. No. 09/343,977, mailed on Sep. 10, 2002.

Final Office Action for U.S. Appl. No. 09/343,977, mailed on Feb. 28, 2003.

Notice of Allowance for U.S. Appl. No. 09/343,997, mailed on May 6, 2003.

Non-Final Office Action for U.S. Appl. No. 09/483,092, mailed on Jun. 4, 2002.

Final Office Action for U.S. Appl. No. 09/483,092, mailed on Nov. 4, 2002.

Non-Final Office Action for U.S. Appl. No. 09/483,092, mailed on Jun. 3, 2004.

Notice of Allowance for U.S. Appl. No. 09/483,092, mailed on Jun. 3, 2004.

Non-Final Office Action for U.S. Appl. No. 10/936,782, mailed on May 11, 2005, 5 pages.

Notice of Allowance for U.S. Appl. No. 10/936,782, mailed on Jan. 27, 2006, 16 pages.

Notice of Allowance for U.S. Appl. No. 10/936,782, mailed on Jul. 12, 2006, 7 pages.

Non-Final Office Action for U.S. Appl. No. 09/905,036, mailed on Mar. 11, 2004, 19 pages.

Final Office Action for U.S. Appl. No. 09/905,036, mailed on Jan. 13, 2005, 19 pages.

Non-Final Office Action for U.S. Appl. No. 09/905,036, mailed on Jul. 11, 2005, 17 pages.

Non-Final Office Action for U.S. Appl. No. 09/905,036, mailed on Apr. 11, 2006, 14 pages.

Final Office Action for U.S. Appl. No. 09/905,036, mailed on Nov. 1, 2006, 15 pages.

Notice of Allowance for U.S. Appl. No. 09/905,036, mailed on Apr. 5, 2007, 10 pages.

Non-Final Office Action for U.S. Appl. No. 11/327,087, mailed on Aug. 18, 2010, 23 pages.

Final Office Action for U.S. Appl. No. 10/936,782, mailed on Jan. 19, 2011, 11 pages.

\* cited by examiner

TECHNIQUES FOR TARGETING INFORMATION TO USERS

CROSS-REFERENCES TO RELATED APPLICATIONS

This application is a continuation of U.S. patent application Ser. No. 09/905,036 filed Jul. 12, 2001 entitled "TECHNIQUES FOR TARGETING INFORMATION TO USERS" filed Jul. 12, 2001, now U.S. Pat. No. 7,257,589, issued Aug. 14, 2007, the entire contents of which are herein incorporated by reference for all purposes.

This application claims priority from the following U.S. Patent Applications, the entire contents of which are herein incorporated by reference for all purposes:

(1) U.S. patent application Ser. No. 08/995,616, entitled, "AUTOMATIC ADAPTIVE DOCUMENT HELP SYSTEM" filed Dec. 22, 1997, now abandoned;

(2) U.S. patent application Ser. No. 09/636,039 entitled, "TECHNIQUES TO FACILITATE READING OF A DOCUMENT" filed Aug. 9, 2000;

(3) U.S. Pat. No. 6,804,659, entitled, "METHOD, SYSTEM AND COMPUTER CODE FOR CONTENT BASED WEB ADVERTISING" issued Oct. 12, 2004; and (4) U.S. patent application Ser. No. 09/483,094, entitled, "METHOD FOR INTRA-DOCUMENT COMPARISON IN A CONTENT BASED WEB ADVERTISING SYSTEM" filed Jan. 14, 2000, now abandoned.

COPYRIGHT NOTICE

A portion of the disclosure of this patent document contains material that is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

BACKGROUND OF THE INVENTION

The present invention relates to providing and outputting information to a user in electronic form, and more particularly to techniques for targeting electronic information to a user based on contents of document(s) viewed or accessed by the user.

With the rapid growth of computers and communication networks such as the Internet, an increasing amount of information is now available to users in electronic or digital form. The information is usually stored by a communication network in the form of documents that can be accessed by a user of the communication network using computer systems coupled to the communication network.

For example, in the World Wide Web (WWW) environment, the information is stored in the form of hypertext documents called web pages that can be accessed by a user using a browser program executing on a client computer coupled to the Internet. A web page may incorporate several information objects storing information of various types. These information objects may include text objects, graphics objects, audio and video content objects, multimedia objects, software program objects, hypertext link objects, and other types of data objects and/or combinations thereof. The hypertext link objects may contain hypertext links to other web pages. Web pages are typically stored on web servers or content servers coupled to the Internet. Each web page is uniquely identified by an address called a Uniform Resource Locator (URL) that enables users to access the web page.

The terms "client" and "server" are used to classify computer systems connected to communication networks such as the Internet based upon the role that the computer systems play with respect to requesting information or providing information. A computer system that is used by a user to request information is referred to as a "client" computer (or a "client"). A computer system that stores information and provides the information in response to an information request received from a client computer is referred to as a "server" computer (or a "server"). A particular computer system may function both as a client and as a server.

Users typically access web pages using a program called a "web browser" which generally executes on a client computer coupled to the Internet. A web browser is a type of client application that enables users to select, retrieve, and perceive information stored by the Internet. Examples of browsers include the Internet Explorer browser program provided by Microsoft Corporation, the Netscape Navigator browser provided by Netscape Corporation, and others. Users generally access web pages by providing URL information to the browser, either directly or indirectly, and the browser responds by retrieving the web page corresponding to the user-provided URL. The retrieved web page is then displayed to the requesting user on the client computer.

Due to the vast volume of information available via communication networks such as the Internet, it is becoming increasingly difficult for a user to identify documents that contain information of interest to the user or to find information that is relevant to the user. While there are several tools (e.g. search engines, etc.) available which help the user in finding relevant information, each of these tools requires manual input from the user and also requires that the user know how to use the tool.

For example, in order to use a search engine, the user has to know how to formulate an appropriate search query that will be used by the search engine to identify documents of interest to the user. Formulating an appropriate search query can be a non-trivial task, especially for those users who are not comfortable with using computers or who are not computer savvy. Further, if the search query is not properly formulated, the results that are returned by the search engine might not suit the user's needs. For example, if the search query is too broad, the number of documents returned by the search engine might be quite large and include documents that are irrelevant to the user. The user is then forced to waste valuable time in identifying relevant documents from the vast number of documents returned by the search engine. Conversely, if the search query is too narrow, then the search engine may miss documents that are relevant to the user.

In light of the above, what is needed are techniques for providing relevant information to users without requiring specific user input. It is further desired that the techniques be able to provide relevant information to a user based upon information or documents accessed by the user and based upon the user's likes and preferences.

BRIEF SUMMARY OF THE INVENTION

The present invention provides techniques for providing relevant information to a user. According to an embodiment of the present invention, the relevant information is selected based on contents of information or documents accessed or viewed by the user. The relevant information is provided automatically to the user without requiring user input. The information provided to the user is selected from information provided by various content provider systems. The present invention uses several techniques to determine relevancy between the contents of the document accessed by the user and between the information provided by the content provider systems. The relevancy information is used to select information to be provided to the user.

According to an embodiment, the present invention provides techniques for providing information to a user based upon contents of a first document displayed to the user. According to this specific embodiment, the present invention identifies the first document displayed to the user, identifies at least a first section of the first document, extracts a first set of information objects from the first section of the first document, determines degree of relevancy information for a second set of information objects, the degree of relevancy information indicating the relevancy of information objects in the second set of information objects to information objects in the first set of information objects, and selects a third set of information objects from information objects in the second set of information objects based upon the degree of relevancy information determined for information objects in the second set of information objects, wherein information objects in the third set of information objects store information to be output to the user when the first document is being displayed to the user.

According to another embodiment of the present invention, a system comprising a user system and a server system is provided for providing information to a user based upon contents of a document displayed to the user. In this embodiment, the user system is used to display the first document to the user. The server system is configured to access a first set of content provider information objects (CPIOs), identify the document displayed to the user, extract a first set of user document information objects (UDIOs) from the document, and identify a plurality of selection techniques for determining degree of relevancy information for the first set of CPIOs. For each selection technique in the plurality of selection techniques, the server system is configured to apply the selection technique to generate degree of relevancy information for the CPIOs, the degree of relevancy information indicating the relevancy of the CPIOs to the UDIOs calculated using the selection technique. The server system is then configured to select a second set of CPIOs from the first set of CPIOs based upon the degree of relevancy information for the CPIOs calculated using the plurality of selection techniques. The user system is configured to output information stored by the second set of CPIOs to the user.

Various additional objects, features and advantages of the present invention can be more fully appreciated with reference to the detailed description and accompanying drawings that follow.

DETAILED DESCRIPTION OF THE INVENTION

The present invention provides techniques for providing relevant information to users. In particular, the present invention provides techniques for providing relevant information (or targeting information) to a user based on information or documents accessed or viewed by the user. According to the teachings of the present invention, the relevant information is provided automatically to the user without requiring user input. Providing or targeting relevant information (or information in which the user is likely to be interested in) to the user involves the organized selection of information to be provided to the user based upon information accessed or viewed by the user and outputting the selected information to the user. The information selected and output to the user may be of various types including electronic text information, news information, advertising information, public information, audio information, video information, multimedia information, images, and other types of information and combinations thereof.

Figure 1:
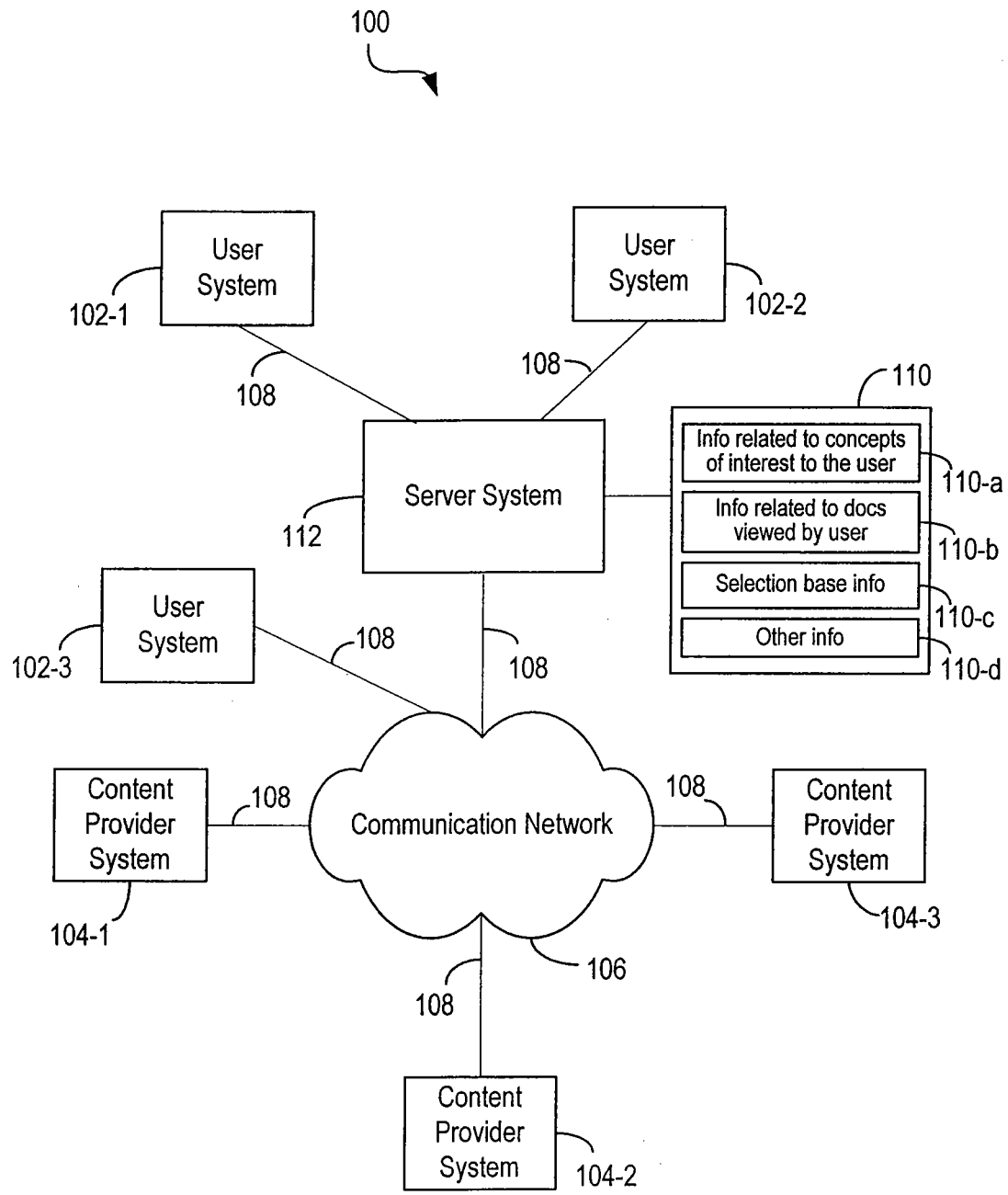
FIG. 1 is a simplified block diagram of a distributed system for targeting information to users according to an embodiment of the present invention.

FIG. 1 is a simplified block diagram of a distributed system 100 for targeting information to users according to an embodiment of the present invention. As shown in FIG. 1, system 100 comprises a plurality of computer systems including one or more content provider systems (CPSs) 104, a server system 112, and one or more user systems 102. Server system 112 and CPSs 104 are coupled to communication network 106 via communication links 108. A database 110 may also be locally or remotely coupled to server 112. User systems 102 may be coupled directly to communication network 106 (e.g. user system 102-3) via communication links 108 or may alternatively be coupled to a server system 112 via communication links 108 (e.g. user systems 102-1 and 102-3).

Distributed system 100 depicted in FIG. 1 is merely illustrative of an embodiment incorporating the present invention and does not limit the scope of the invention as recited in the claims. One of ordinary skill in the art would recognize other variations, modifications, and alternatives.

Communication network 106 provides a mechanism allowing the various computer systems depicted in FIG. 1 to communicate and exchange information with each other. Communication network 106 may itself be comprised of many interconnected computer systems and communication links. While in one embodiment communication network 106 is the Internet, in other embodiments, communication network 106 may be any suitable computer network including a local area network (LAN), a wide area network (WAN), a wireless network, an intranet, a private network, a public network, a switched network, and the like.

Communication links 108 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP and HTML protocols, extensible markup language (XML), wireless application protocol (WAP), vendor-specific protocols, customized protocols, and others.

Users may use user systems 102 to request and view information stored within distributed network 100. The term "users" as used in this application may refer to one or more human beings interacting with an user system 102, one or more processes executing on user system 102, systems or devices coupled to user systems 102, and other like entities which may access information via user system 102.

As indicated above, the information stored within distributed network 100 may be organized in the form of documents and the user may access the documents via user system 102. For example, in the WWW environment, the information is organized in the form of web pages that may be accessed by the user via a browser program executing on user system 102. Several different types of documents may be accessed by the user including documents created using word processor programs, multimedia documents, spreadsheets, electronic mail (email) documents, text documents, images or graphics file, audio files, video files, or other types of documents and combinations thereof. These documents may be accessed by the user via programs such a word processor, an email program, a text editor, a browser, and other like applications executing on user system 102. In general, the term "access program" will be used throughout this application to refer to a program or application which executes on user system 102 (or on devices coupled to user system 102) and which is used by a user of user system 102 to access documents or other information stored locally by user system 102 or stored by the various components of distributed system 100.

Information targeted for a user according to the teachings of the present invention may also be output to the user via user system 102. According to an embodiment of the present invention, the targeted information is output to the user without requiring any specific user input or interaction. The selected information may be presented to the user using several different techniques. According to an embodiment of the present invention, the selected information is presented to the user in a specially designated area (hereinafter referred to as the "selected information display area") of an access program executing on user system 102. One or more "selected information display areas" may be provided on an access program for displaying or outputting the selected information. The selected information display areas provide consistent, unobtrusive access to the selected information. The selected information may also be output to the user via audio and/or video output devices coupled to user system 102.

A user system 102 typically operates as a client requesting information from servers coupled to distributed network 100. It should however be apparent that a particular user system 102 may act both as a client or a server depending on whether the user system is requesting or providing information.

Content provider systems 104 are configured to store information that may be requested and accessed by users of user systems 102. As indicated above, content provider systems 104 may store the information in the form of documents. For example, content provider systems 104 may host web sites that may store web pages that may be accessed by the users. In a specific embodiment of the present invention, a content provider system 104 may receive a web page request from a user system, and in response, the content provider system may determine the requested web page and forward the requested web page to the requesting user system 102. For user systems coupled to communication network 106 via server system 112, the request web page may be communicated to the requesting user system via server system 112.

According to the teachings of the present invention, content provider systems 104 may also provide information (hereinafter referred to as "selection base information") from which the information to be targeted to a particular user is selected. According to an embodiment of the present invention, the selection base information is stored by the content provider systems and made accessible to server 112 that performs the selection process. Alternatively, the selection base information may be communicated by the content provider systems to server 112 and stored by server 112. The selection base information may be stored and communicated to server system 112 in various forms such as a digital document, as a data structure, as a database, etc.

According to an embodiment of the present invention, server system 100 is configured to perform processing to select information from the selection base information to be targeted to users of user systems 102 based upon information accessed or viewed by the users. As indicated above, the user systems may be directly coupled to communication network 106 or may be coupled via communication network 106 via server system 112. For user systems that are coupled to the communication network via a server system, the selection of information may be performed by the server system. For user systems which are not coupled to a server system (e.g. user system 102-3), the information selection may be performed by the user system itself (computer system acts both as a user system and as a server system) or by a server system remotely coupled to the user system via communication network 106.

In order to facilitate selection of the information to be provided to users, server system 112 is configured to monitor information or documents accessed or viewed by the users. Based upon the document(s) viewed/accessed by the users, server 112 selects information that is likely to be relevant to the users from selection base information provided to or made accessible to server system 112.

Server system 112 may use several different techniques to determine and select information which may be of interest to a particular user and which is to be provided to the particular user. According to a first technique, the selection may be performed using a "concept-based" selection technique wherein server system 112 determines if the contents of the document(s) viewed/accessed by the particular user are relevant to concepts of interest to the user and then uses the relevant concepts to determine information from the selection base information to be provided to the user.

Information related to concepts of interest for a particular user may be provided by the user and stored in a user profile file accessible to server system 112. In alternative embodiments of the present invention, the user profile information may be automatically generated by server system 112 based upon the particular user's interactions with user system 102 and based upon information accessed by the user via user system 102. For example, server 112 may analyze the URLs associated with web pages accessed by the user via user system 102 to determine information related to web sites accessed by the user and use that information to determine concepts of interest to the user. Server 112 may also analyze the contents of web pages accessed by the user. Server 112 may also monitor "web channels" that a user peruses and use that information to build a user profile. Other information related to the particular user accessible to server system 112, e.g., demographic information related to user, etc., may also be used to build a user profile for the particular user.

According to another technique, server system 112 compares the contents of the document(s) viewed/accessed by the user with the contents of the selection base information and determines information from the selection base information to be provided to the user based upon the results of the comparison. Several other techniques may also be used by server system 112 to select information to be presented to the user. Server system 112 may also use a plurality of selection techniques and then combine the results of the plurality of selection techniques to determine information to be presented to the user. Further details related to techniques used by server system 112 to select information to be provided to the user are described below.

Information used by server system 112 for the information selection process may be stored in database 110 that is coupled either locally or remotely to server 112. For example, information 110-a related to concepts of interest to a user, information related to documents viewed by the user 110-b, selection base information 110-c, etc. may be stored in database 110. Other information 110-d used by server 112 may also be stored by server 112.

Figure 2:
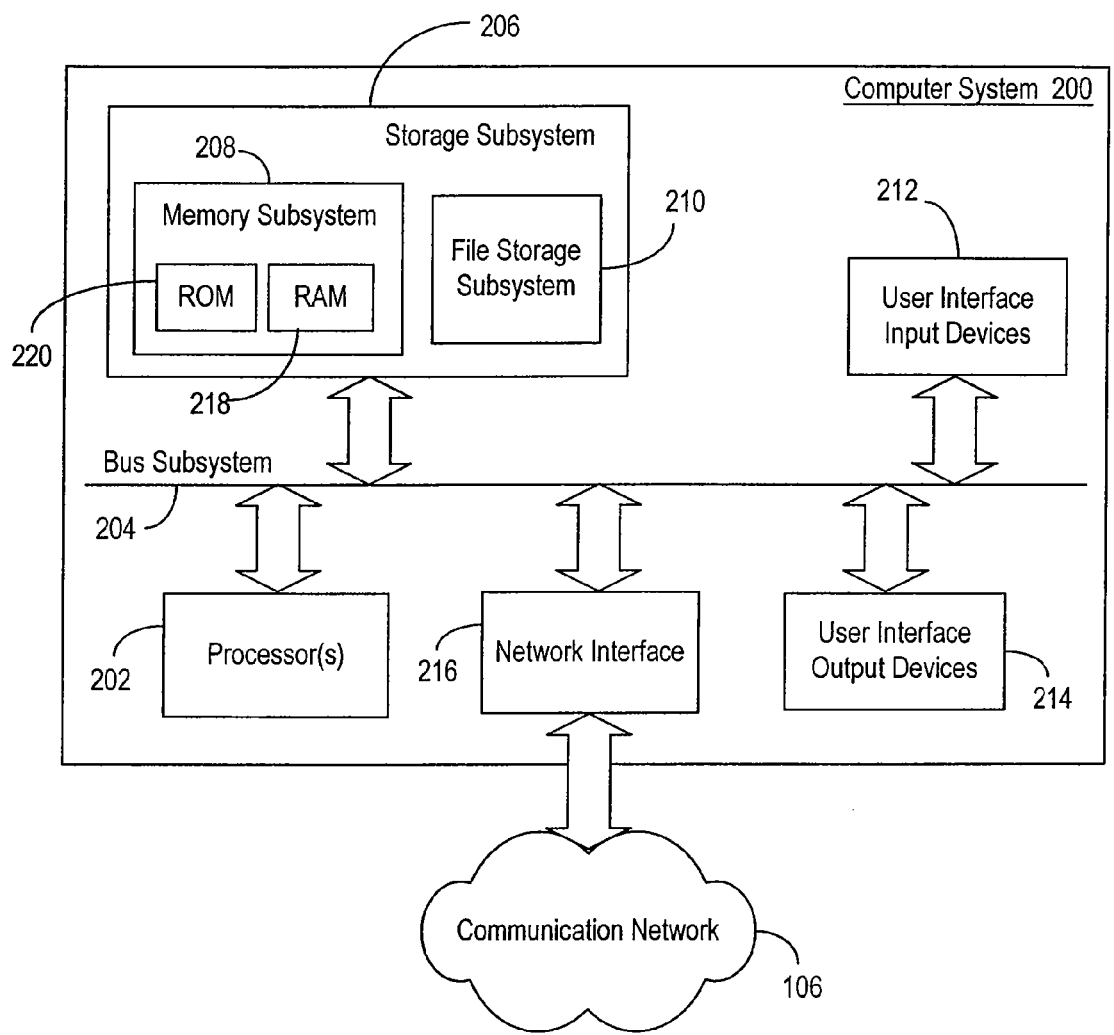
FIG. 2 is a simplified block diagram of a computer system according to an embodiment of the present invention.

FIG. 2 is a simplified block diagram of a computer system 200 according to an embodiment of the present invention. Computer system 200 may be used as user (or client) system 102, a content provider system 104, a server system 112, and any other system included in distributed network 100. As shown in FIG. 2, computer system 200 includes at least one processor 202, which communicates with a number of peripheral devices via a bus subsystem 204. These peripheral devices may include a storage subsystem 206, comprising a memory subsystem 208 and a file storage subsystem 210, user interface input devices 212, user interface output devices 214, and a network interface subsystem 216. The input and output devices allow user interaction with computer system 200. As previously indicated, a user may be a human user, a device, a process, another computer, and the like. Network interface subsystem 216 provides an interface to other computer systems and to communication network 106.

Bus subsystem 204 provides a mechanism for letting the various components and subsystems of computer system 200 communicate with each other as intended. The various subsystems and components of computer system 200 need not be at the same physical location but may be distributed at various locations within network 100. Although bus subsystem 204 is shown schematically as a single bus, alternative embodiments of the bus subsystem may utilize multiple busses.

User interface input devices 212 may include a keyboard, pointing devices such as an optical tablet, a mouse, trackball, touchpad, a graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 200.

User interface output devices 214 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 200.

Storage subsystem 206 may be configured to store the basic programming and data constructs that provide the functionality of the present invention. For example, according to an embodiment of the present invention, software modules implementing the functionality of the present invention may be stored in storage subsystem 206. These software modules may be executed by processor(s) 202 of computer system 200. In a distributed environment, the software modules may be stored on a plurality of computer systems and executed by processors of the plurality of computer systems. Storage subsystem 206 may also provide a repository for storing various databases that may be used by the present invention. Storage subsystem 206 may comprise memory subsystem 208 and file storage subsystem 210.

Memory subsystem 208 may include a number of memories including a main random access memory (RAM) 218 for storage of instructions and data during program execution and a read only memory (ROM) 220 in which fixed instructions are stored. File storage subsystem 210 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers.

Computer system 200 itself can be of varying types including a personal computer, a portable computer, a workstation, a computer terminal, a network computer, a mainframe, a kiosk, a personal digital assistant (PDA), a communication device such as a cell phone, or any other data processing system. Due to the ever-changing nature of computers and networks, the description of computer system 200 depicted in FIG. 2 is intended only as a specific example for purposes of illustrating the preferred embodiment of the computer system. Many other configurations of a computer system are possible having more or fewer components than the computer system depicted in FIG. 2. Computer system 200 may function as a client or a server, or combinations thereof.

Figure 3:
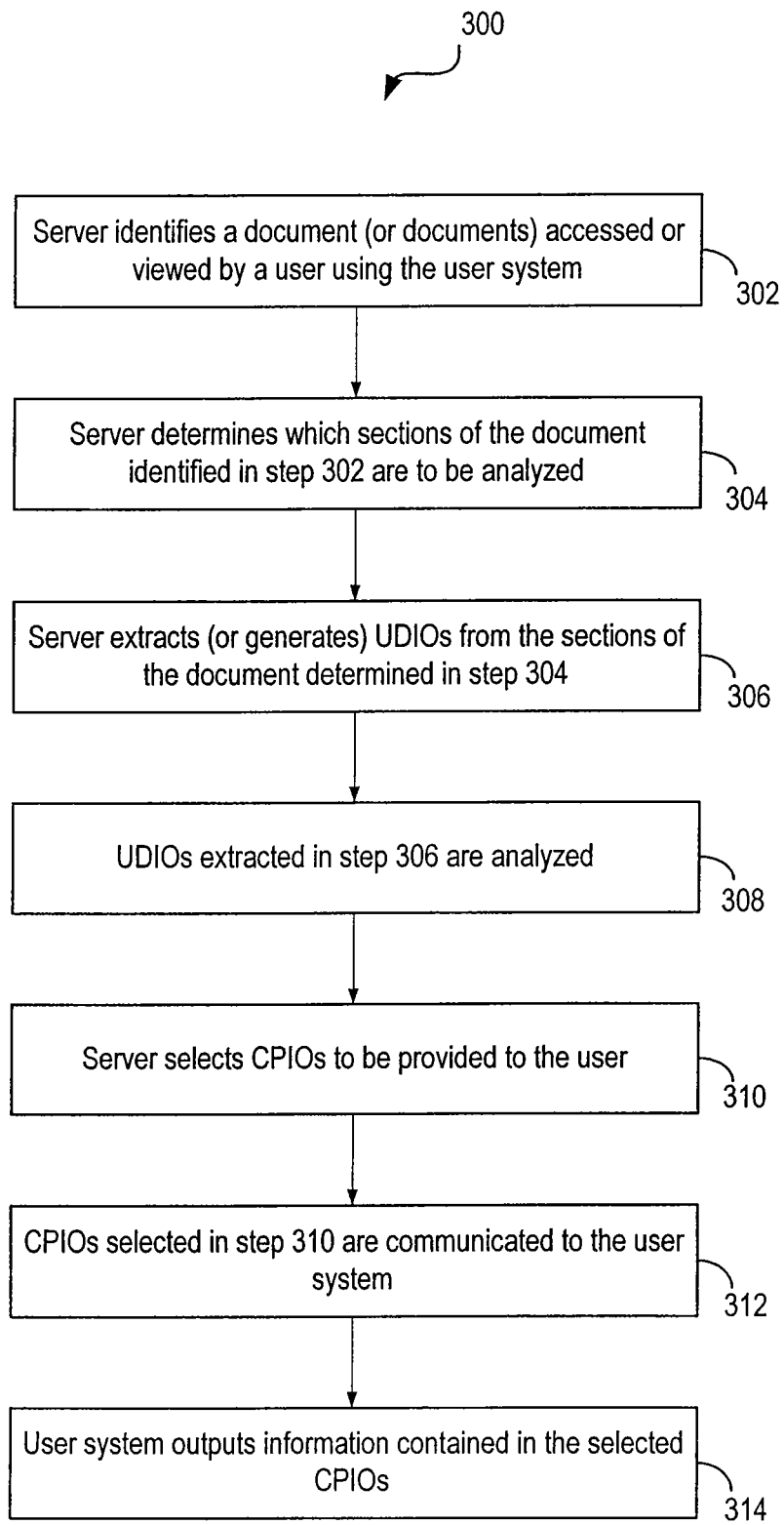
FIG. 3 is a simplified high-level flowchart showing a method of providing targeted information to the user according to an embodiment of the present invention.

FIG. 3 is a simplified high-level flowchart 300 showing a method of providing targeted information to the user according to an embodiment of the present invention. Flowchart 300 depicted in FIG. 3 is merely illustrative of an embodiment incorporating the present invention and does not limit the scope of the invention as recited in the claims. One of ordinary skill in the art would recognize other variations, modifications, and alternatives. According to an embodiment of the present invention, server 112 performs steps 302, 302, 306, 308, 310, and 312, and user system 102 performs step 314. Software code modules executed by server 112 may implement the method. Hardware modules of server 112 and user system 102 in conjunction with the software modules may also implement the method.

As shown in FIG. 3, the method is initiated when server 112 identifies a document (or documents) that is accessed or view by a user of user system 102 (step 302). As previously indicated, the document may be of different formats including a web page, a word-processor document, an email message, a spreadsheet, and the like. The document may be accessed or viewed by the user using an access program executing on user system 102. For the embodiment depicted in FIG. 3, and for sake of simplicity, the invention has been described assuming that the selection is based upon a single document being viewed or accessed by a user using user system 102. However, the scope of the present invention is not restricted to analysis of a single document. According to the teachings of the present invention, the selection of information may be performed based on analysis of a plurality of documents or information viewed or accessed by the user presently and in the past.

After identifying the document viewed or accessed by the user, server system 112 then determines one or more sections of the document to be analyzed (step 304). Server system 112 may be configured to analyze the entire document, including sections of the document not viewed by the user, or alternatively, server system 112 may be configured to analyze specific sections of the document. According to an embodiment of the present invention, server system 112 may be configured to only analyze the section of the document that is viewed by the user using the access program. Alternatively, server system 112 may be configured to analyze other sections of the document such as the title section of the document, the summary section of the document, specific headings or sub-headings within the document, specific paragraphs within the document, and the like, and combinations thereof. According to an embodiment of the present invention, the sections of the document to be analyzed are user configurable.

Server system 112 then extracts information objects from the section(s) of the document determined in step 304 (step 306). In general, the term "information object" is meant to refer to an entity (e.g. a data structure, an object, etc.) which stores information of a particular type. The types of information may include text, audio, video, images, and the like. For example, a text information object stores information of type text, an audio information object (e.g. a MP3 object) stores audio information, a video information object (e.g. a MPEG video object) stores video information, an image information object (e.g. a GIF object, a JPEG object) stores image information, and the like.

One or more information objects may be embedded in the document viewed or accessed by the user. For example, information objects which may be embedded in a web page may include text objects, graphics objects, audio and video content objects, multimedia objects, software program objects, hypertext link objects, and the like. As part of the processing performed in step 306, server system 112 extracts information objects embedded in the section of the document to be analyzed as determined in step 304. Alternatively, as part of the processing performed in step 306, server 112 may extract the contents of the section of the document to be analyzed and build one or more information objects of the appropriate type based on the extracted content information. For purposes of this application, an information object extracted from a document viewed or accessed by a user or generated based upon content extracted from a document viewed/accessed by the user will be referred to as a "user document information object" (or UDIO in short). The UDIOs extracted in step 306 may be stored in database 110 accessible to server system 112.

Server system 112 also extracts (or generates) information objects from the selection base information provided by content provider systems 104. An information object extracted from the selection base information or generated based upon content from the selection base information will be referred to as a "content provider information object" (or CPIO in short). Extraction of CPIOs may be performed when server system receives the selection base information from one or more content provider systems. In alternative embodiments, the content provider systems may provide the CPIOs to the server system, in which case server system 112 does not have to perform the extraction. According to an embodiment of the present invention, the CPIOs are stored in database 110 coupled to server system 112. In alternative embodiments of the present invention, the CPIOs may be stored by the content provider systems and accessed by server system 112 via communication network 106.

The UDIOs extracted in step 306 are then analyzed to determine information related to the contents of the extracted UDIOs (step 308). Based upon information obtained from analyzing the UDIOs in step 308 and based upon information related to CPIOs accessible to server system 112, server 112 then selects one or more CPIOs to be provided to the user (step 310). Server system 112 may employ several different selection techniques to select the CPIOs in step 310. Further details related to techniques employed in specific embodiments of the present invention are provided below.

The CPIOs selected in step 310 are then communicated to user system 102 (step 312). Various communication protocols may be used to communicate the selected CPIOs to the user system. The information stored by the selected CPIOs is then output to the user at the user system (step 314). As discussed above, various techniques may be used to output the information contained in the selected CPIOs to the user. According to an embodiment of the present invention, the information contained in the selected CPIOs is output to the user in one or more "selected information display areas" provided on an access program which the user uses to view/access the document identified in step 302. The selected information may also be output to the user via audio and/or video output devices coupled to user system 102.

Figure 4:
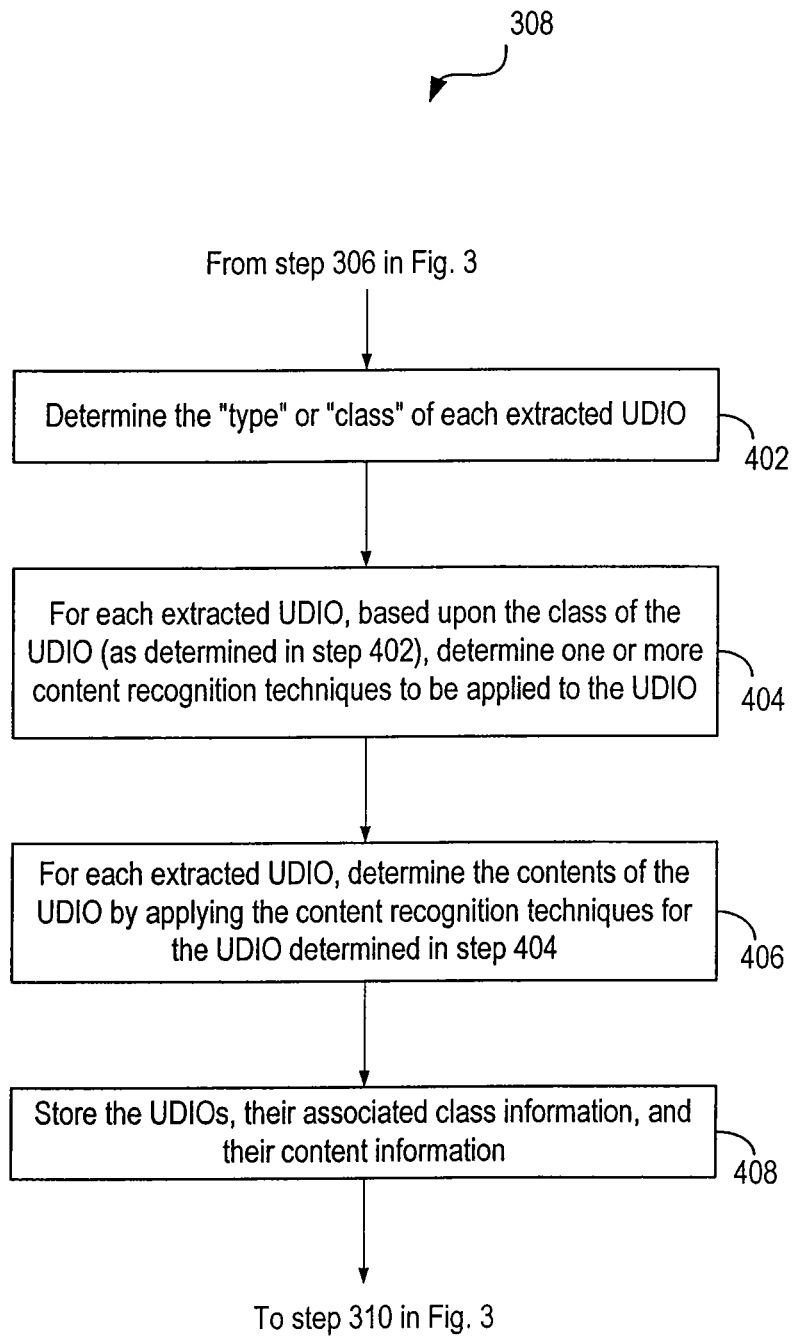
FIG. 4 is a simplified high-level flowchart showing processing performed for extracting UDIOs according to an embodiment of the present invention.

FIG. 4 is a simplified high-level flowchart showing processing performed in step 308 of FIG. 3 according to an embodiment of the present invention. FIG. 4 is merely illustrative of an embodiment incorporating the present invention and does not limit the scope of the invention as recited in the claims. One of ordinary skill in the art would recognize other variations, modifications, and alternatives.

As shown in FIG. 4, server system 112 determines the "type" or "class" of each UDIO extracted (or generated) in step 306 of FIG. 3 (step 402). The class or type of an information object depends on the type of information contained or stored by the information object. For example, a UDIO which stores or contains text information is of type "text", a UDIO which stores or contains audio information is of type "audio", a UDIO which stores or contains video information is of type "video", a UDIO which stores or contains image information is of type "image", and so on. The type or class of an information object thus indicates the type of content or information stored or contained by the information object.

For each UDIO, server system 112 then determines content recognition techniques to be applied to the UDIO based upon the class of the UDIO determined in step 402 (step 404). For each UDIO, the content recognition techniques determined for the UDIO in step 404 are then applied to the UDIO to determine the contents of the UDIO (step 406). Various types of content recognition techniques may be used based upon the type of a UDIO. For example, for an audio UDIO (e.g. a sound clip), voice recognition techniques (e.g. ViaVoice voice recognition program) may be applied to generate a text transcript corresponding to the sound clip. Content recognition techniques applied to an audio UDIO may also determine attributes of the sound source(s) in the audio UDIO. For example, the content recognition techniques may determine the identity of the speaker(s) in the sound clip. Content recognition techniques applied to a video UDIO (e.g. a video clip) may determine keyframes from the video. Audio recognition techniques may also be applied to a video UDIO to generate a text transcript corresponding to the audio associated with the video. Other content recognition techniques may determine the contents of the video and the context of the events depicted by the video. For example, a particular content recognition technique may determine the entities depicted in the video clip (e.g. determine that the entities are human, animals, machines, etc. and information associated with the entities) and the context of the video, e.g. identify the locations depicted in the video object (e.g. geographical locations such as London, Paris, The White House, a field, a battleground, a specific opera, etc.), time line for the information included in the video UDIO (e.g. Year 2000 U.S. Elections, the 1999 Super Bowl, the dinosaur age, etc.), and other contexts. For image objects, optical character recognition (OCR) techniques may be used to determine the contents of the image. For text objects, a copy of the textual information may be obtained. Various other content recognition techniques may also be used to determine the contents of the UDIOs.

For each extracted UDIO, the type information associated with the UDIO (determined in step 402), and information related to the contents of the UDIO (determined in step 406) is stored for future processing (step 408). According to an embodiment of the present invention, the information is stored in database 110 coupled to server system 112. Processing then continues with step 310 in FIG. 3.

Server system 112 may also use the processing steps shown in FIG. 4 to determine the contents of CPIOs extracted from (or generated from) the selection base information. This processing may be performed when the server system receives the CPIOs or when the CPIOs are extracted from the selection base information. For each CPIO, the type information associated with the CPIO, and information related to the contents of the CPIO may be stored in database 110 coupled to server system 112 for future processing.

Figure 5:
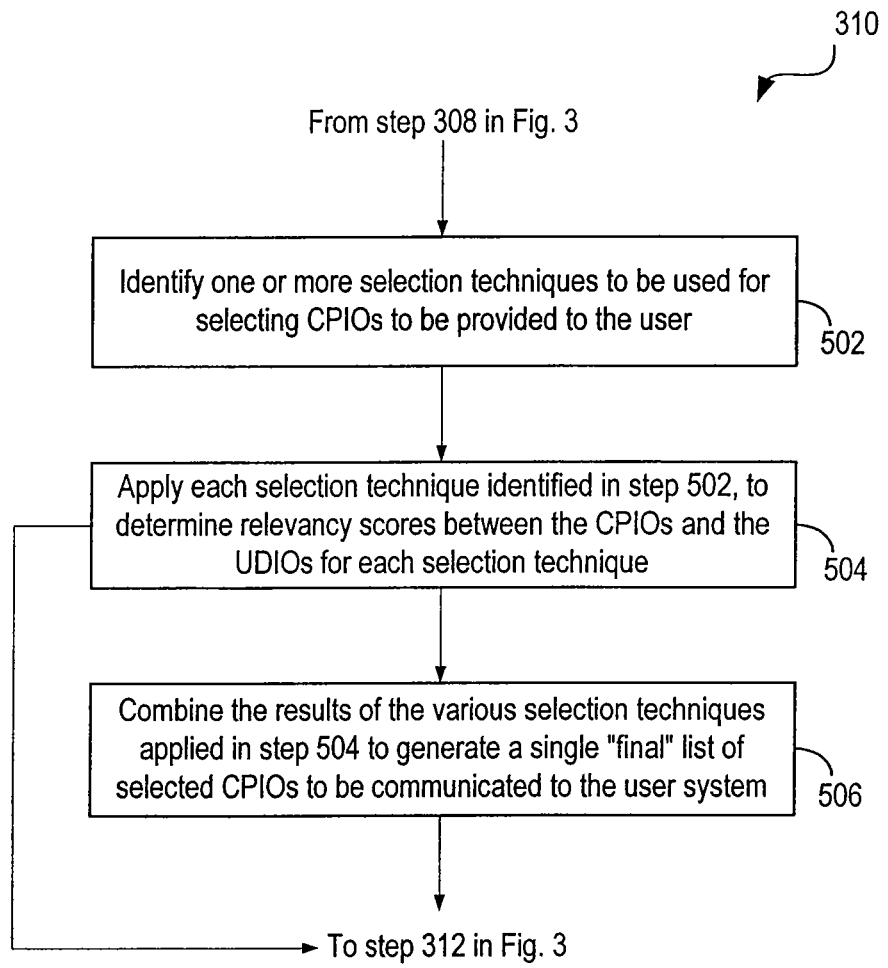
FIG. 5 is a simplified high-level flowchart showing processing performed for selecting CPIOs to be provided to the user according to an embodiment of the present invention.

FIG. 5 is a simplified high-level flowchart showing processing performed in step 310 of FIG. 3 according to an embodiment of the present invention. As shown in FIG. 5, server 112 identifies one or more selection techniques to be used for selecting the CPIOs to be provided to the user (step 502). Several different selection techniques may be used in accordance with the present invention. According to a specific embodiment of the present invention, a "concept-based" selection technique and an "object class-based" selection technique are used to identify CPIOs to be presented to the user. Details related to the concept-based and class-based selection techniques are provided below. According to specific embodiments of the present invention, the user of the present invention may specify and/or configure the selection techniques to be used for selection of CPIOs.

Server 112 then applies each selection technique identified in step 502 to determine relevancy between the CPIOs and the UDIOs for each selection technique (step 504). The results of the various selection techniques applied in step 504 are then combined to generate a single "final" list of one or more selected CPIOs objects to be communicated to user system 102 (step 506). The single "final" list of selected CPIOs is then communicated to user system 102 according to step 312 in FIG. 3.

In alternative embodiments of the present invention, instead of combining the results from the various selection techniques into one single "final" list of CPIOs, server system 112 may be configured to communicate the CPIOs selected using the various selection techniques to user system 102. In this embodiment, for each selection technique, server system 112 communicates a list of selected CPIOs to the user system along with information identifying the selection technique used for selecting the CPIOs. User system 102 may then output information contained by CPIOs in the various lists received from the server system along with information indicating the technique used for selecting the CPIOs in the lists.

According to an embodiment of the present invention, the user is allowed to select whether the CPIOs lists generated in step 504 by applying the various selection techniques are to be combined (as shown in FIG. 5) or whether the lists themselves are to be communicated to user system 102. In alternative embodiments of the present invention, the user may also be allowed to selectively chose which lists from those generated in step 504 are to be communicated to user system 102.

Figure 6:
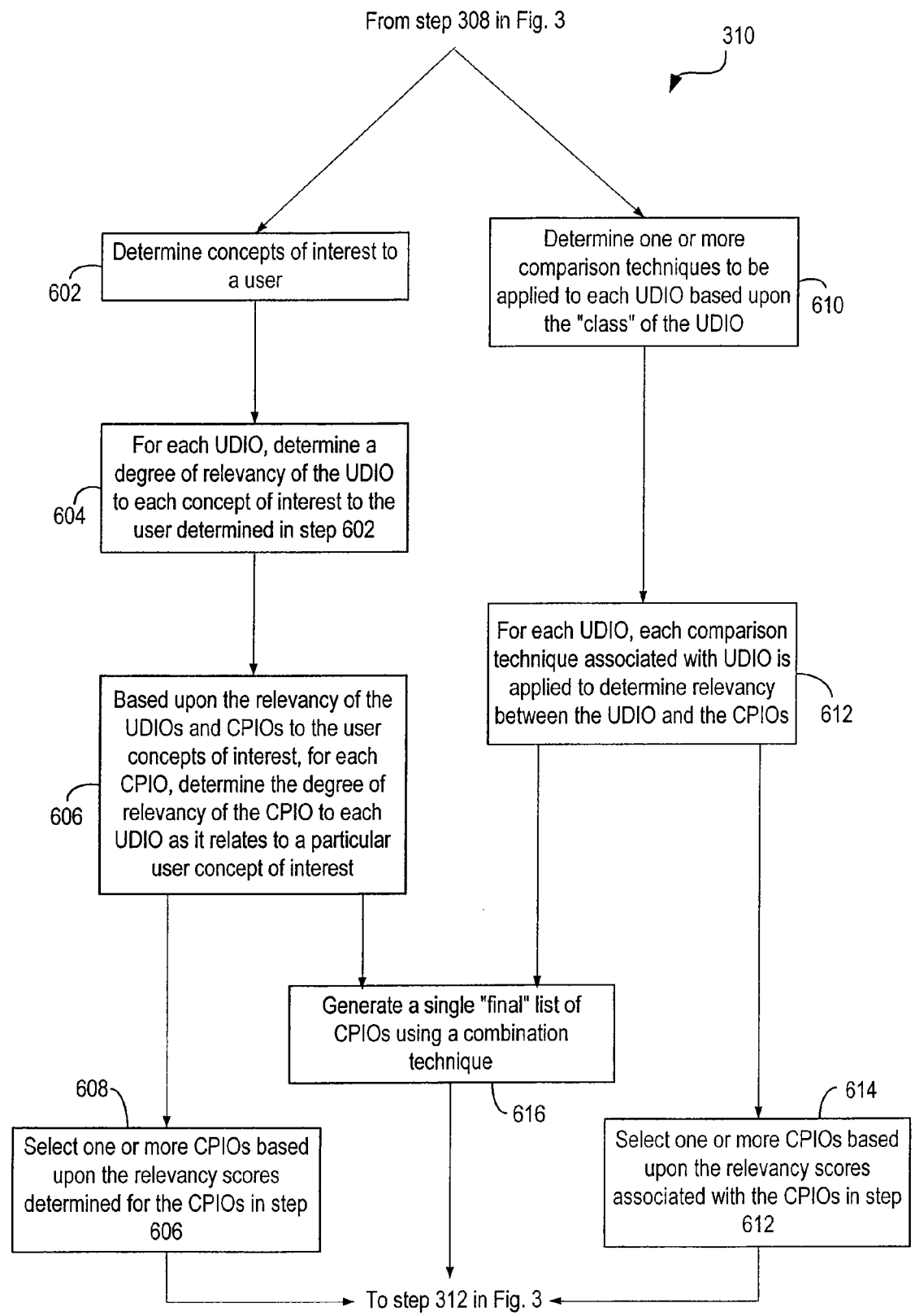
FIG. 6 is a simplified high-level flowchart showing a method of selecting CPIOs using a class-based selection technique and a concept-based selection technique according to an embodiment of the present invention.

As indicated above, according to a specific embodiment of the present invention, a "class-based" selection technique and a "concept-based" selection technique are used for selecting CPIOs to be communicated to user system 102. FIG. 6 depicts a simplified high-level flowchart 600 showing a method of selecting CPIOs using a class-based selection technique and a concept-based selection technique according to an embodiment of the present invention. Flowchart 600 depicted in FIG. 6 is merely illustrative of an embodiment incorporating the present invention and does not limit the scope of the invention as recited in the claims. One of ordinary skill in the art would recognize other variations, modifications, and alternatives. Steps 602, 604, and 606 depict processing performed according to the concept-based selection technique, while steps 610 and 612 depict processing performed according to the class-based selection technique.

As shown in FIG. 6, the concept-based selection technique is initiated when server system 112 determines concepts of interest to the user (step 602). As indicated above, information related to concepts of interest to the user (or "user concepts information") may be stored in a user profile file accessible to server system 112. A concept identifier may identify each concept of interest to a user. One or more keywords or key phrases may be associated with each concept (as identified by the concept identifier). A probability value may be associated with each keyword or key phrase indicating the probability that the concept as identified by the concept identifier is discussed given the presence of the keyword or key phrase. For example, a user may be interested in a concept called "Football" and the keywords associated with the concept may include "San Francisco 49ers," "Joe Montana," "Super Bowl," and the like. Probability values may be associated with the keywords.

As described above, according to an embodiment of the present invention, a concept of interest to the user may be represented as follows:

Concept=(Concept_Identifier, <Keywords_and_probabilities>)

where:

Concept_Identifier=identifies the concept; and

<Keywords_and_probabilities>=is a vector of keywords (or key phrases) and probability values associated with the keywords indicating the probability that the concept as identified by the concept identifier is discussed given the presence of the keyword.

A particular concept may be further divided in sub-concepts that may in turn be divided in sub-sub-concepts, and so on. According to a specific embodiment of the present invention, a Bayesian belief network may be used to represent user concepts information. For a description of a specific embodiment of a Bayesian network, please refer to U.S. patent application Ser. No. 08/995,616, entitled, "AUTOMATIC ADAPTIVE DOCUMENT HELP SYSTEM" filed Dec. 22, 1997, the entire contents of which are herein incorporated by reference for all purposes.

The user concepts information may be configured by the user or may be alternatively be automatically compiled by server system 112 by monitoring the user's interactions with the user system and by monitoring information accessed by the user. Several tools may be provided to configure the contents of the user profile. One such user profile editor is described in U.S. patent application Ser. No. 08/995,616.

Referring back to FIG. 6, for each UDIO, server system 112 then determines a degree of relevancy of the UDIO to each concept of interest to the user determined in step 602 (step 604). According to an embodiment of the present invention, the output of step 604 may be represented by a table such as Table 1 shown below:

TABLE 1

UDIO relevance table

| UDIO | Concept of interest to the User | Degree of relevancy of the UDIO to the concept of interest to the user |
|---|---|---|
| $UDIO_1$ | $C_1$ | $R_{11}$ |
| $UDIO_1$ | $C_2$ | $R_{12}$ |
| ... | ... | ... |
| $UDIO_1$ | $C_m$ | $R_{1m}$ |
| $UDIO_2$ | $C_1$ | $R_{21}$ |
| $UDIO_2$ | $C_2$ | $R_{22}$ |
| ... | ... | ... |
| $UDIO_2$ | $C_m$ | $R_{2m}$ |
| ... | ... | ... |
| ... | ... | ... |
| $UDIO_n$ | $C_1$ | $R_{n1}$ |
| $UDIO_n$ | $C_2$ | $R_{n2}$ |
| ... | ... | ... |
| $UDIO_n$ | $C_m$ | $R_{nm}$ | where:
"n" Indicates the total number of extracted UDIOs
"m" Indicates the total number of concepts of interest to the user
"$UDIO_i$" Indicates the $i^{th}$ UDIO
"$C_j$" Indicates the $j^{th}$ user concept of interest
"$R_{ij}$" Denotes a value indicating the degree of relevancy of $UDIO_i$ to user concept of interest $C_j$ (e.g. $R_{12}$ indicates the degree of relevancy of $UDIO_1$ to user concept $C_2$). The degree of relevancy value may be zero if the UDIO is not relevant to the concept.

Several different techniques may be used by server system 112 to determine the degree of relevancy. According to one technique, server 112 may compare the content information associated with a UDIO with the keywords and their associated probability values ("<Keywords_and_probabilities>") associated with the concept and determine the degree of relevancy based upon the comparison. Other techniques to determine the degrees of relevancy have been described in U.S. patent application Ser. Nos. 08/995,616, 09/636,039, 09/483,092, and 09/483,094, the entire contents of which have been incorporated by reference for all purposes. Several other techniques known to those of skill in the art may also be used to determine the degrees of relevancy.

Server system 112 may build a table similar to Table 1 for CPIOs. The table built for CPIOs (as shown in Table 2) may store degree of relevancy information for the CPIOs as they relate to each concept of interest to the user. Server system 112 may build the CPIO relevance table after contents for the CPIOs have been determined using one or more content recognition techniques.

TABLE 2

CPIO relevance table

| CPIO | Concept of interest to the User | Degree of relevancy of the CPIO to the concept of interest to the user |
|---|---|---|
| $CPIO_1$ | $C_1$ | $R_{11}$ |
| $CPIO_1$ | $C_2$ | $R_{12}$ |
| ... | ... | ... |
| $CPIO_1$ | $C_m$ | $R_{1m}$ |
| $CPIO_2$ | $C_1$ | $R_{21}$ |
| $CPIO_2$ | $C_2$ | $R_{22}$ |
| ... | ... | ... |
| $CPIO_2$ | $C_m$ | $R_{2m}$ |
| ... | ... | ... |
| ... | ... | ... |
| $CPIO_p$ | $C_1$ | $R_{p1}$ |
| $CPIO_p$ | $C_2$ | $R_{p2}$ |
| ... | ... | ... |
| $CPIO_p$ | $C_m$ | $R_{pm}$ | where:
"p" Indicates the total number of CPIOs
"m" Indicates the total number of concepts of interest to the user
"$CPIO_k$" Indicates the $k^{th}$ CPIO
"$C_j$" Indicates the $j^{th}$ user concept of interest
"$R_{kj}$" Denotes a value indicating the degree of relevancy of $CPIO_k$ to user concept of interest $C_j$ (e.g. $R_{12}$ indicates the degree of relevancy of $CPIO_1$ to user concept $C_2$). The degree of relevancy value may be zero if the CPIO is not relevant to the concept.

Based upon the information contained in the UDIO relevance table (e.g. Table 1) and the CPIO relevance table (e.g. Table 2), for each CPIO, server system 112 determines the degree of relevancy (or a relevance score) of the CPIO to each UDIO as it relates to a particular user concept of interest (i.e. the server determines the degree of relevancy of a CPIO to a (UDIO, Concept) pair) (step 606). According to an embodiment of the present invention, the degree of relevancy of a CPIO may be calculated for only those UDIOs whose degree of relevancy ("R" shown in Table 1) to a particular user concept of interest is above a user-configurable threshold value. This helps reduce the amount of processing performed by server 112.

According to an embodiment of the present invention, the output of step 606 may be represented by Table 3 shown below:

TABLE 3

| UDIO | Concept of interest to the User | Degree of relevancy of the UDIO to the concept of interest to the user | List of CPIOs and their relevancy to a UDIO as it applies to a particular concept of interest to the user |
|---|---|---|---|
| $UDIO_1$ | $C_1$ | $R_{11}$ | <($CPIO_1$, $RR_{111}$), ($CPIO_2$, $RR_{211}$), ... ($CPIO_p$, $RR_{p11}$)> |
| $UDIO_1$ | $C_2$ | $R_{12}$ | <($CPIO_1$, $RR_{112}$), ($CPIO_2$, $RR_{212}$), ... ($CPIO_p$, $RR_{p12}$)> |
| ... | ... | ... | ... |
| $UDIO_1$ | $C_m$ | $R_{1m}$ | <($CPIO_1$, $RR_{11m}$), ($CPIO_2$, $RR_{21m}$), ... ($CPIO_p$, $RR_{p1m}$)> |
| $UDIO_2$ | $C_1$ | $R_{21}$ | <($CPIO_1$, $RR_{121}$), ($CPIO_2$, $RR_{221}$), ... ($CPIO_p$, $RR_{p21}$)> |
| $UDIO_2$ | $C_2$ | $R_{22}$ | <($CPIO_1$, $RR_{122}$), ($CPIO_2$, $RR_{222}$), ... ($CPIO_p$, $RR_{p22}$)> |
| ... | ... | ... | ... |
| $UDIO_2$ | $C_m$ | $R_{2m}$ | <($CPIO_1$, $RR_{12m}$), ($CPIO_2$, $RR_{22m}$), ... ($CPIO_p$, $RR_{p2m}$)> |
| ... | ... | ... | ... |
| $UDIO_n$ | $C_1$ | $R_{n1}$ | <($CPIO_1$, $RR_{1n1}$), ($CPIO_2$, $RR_{2n1}$), ... ($CPIO_p$, $RR_{pn1}$)> |

TABLE 3-continued

| UDIO | Concept of interest to the User | Degree of relevancy of the UDIO to the concept of interest to the user | List of CPIOs and their relevancy to a UDIO as it applies to a particular concept of interest to the user |
|---|---|---|---|
| $UDIO_n$ | $C_2$ | $R_{n2}$ | $<(CPIO_1, RR_{1n2}), (CPIO_2, RR_{2n2}), \ldots (CPIO_p, RR_{pn2})>$ |
| ... | ... | ... | ... |
| $UDIO_n$ | $C_m$ | $R_{nm}$ | $<(CPIO_1, RR_{1nm}), (CPIO_2, RR_{2nm}), \ldots (CPIO_p, RR_{pnm})>$ | where:
"n" Indicates the total number of extracted UDIOs
"m" Indicates the total number of concepts of interest to the user
"p" Indicates the total number of CPIOs
"$UDIO_i$" Indicates the $i^{th}$ UDIO
"$C_j$" Indicates the $j^{th}$ user concept of interest
"$CPIO_k$" Indicates the $k^{th}$ CPIO
"$R_{ij}$" Denotes a value indicating the degree of relevancy of $UDIO_i$ to user concept of interest $C_j$ (e.g. $R_{12}$ indicates the degree of relevancy of $UDIO_1$ to user concept $C_2$). The degree of relevancy value may be zero if the UDIO is not relevant to the concept.
$RR_{kij}$ Denotes a value indicating the degree of relevancy of $CPIO_k$ to $UDIO_i$ as it relates to user concept of interest $C_j$. This value may be zero if a particular CPIO is not relevant to a particular UDIO as it relates to a particular user concept of interest. According to an embodiment of the present invention, value $RR_{kij}$ may be based upon the value of $R_{ij}$ in Table 1 (i.e. the degree of relevancy of $UDIO_i$ to user concept of interest $C_j$) and the value of $R_{kj}$ in Table 2 (i.e. the degree of relevancy of $CPIO_k$ to a particular user concept of interest $C_j$).

The list of CPIOs for each UDIO as it relates to a particular user concept of interest may be ranked or ordered based upon the degrees of relevancy of the CPIOs (i.e. based on the value of RR). Several techniques may be used by server 112 to determine the relevancy of CPIOs to a particular UDIO as it relates to a particular user concept of interest. According to a one technique, a simple linear combination may be used. According to the linear combination technique, the value of RR may be expressed as follows:

$$RR_{kij} = (W_1 * R_{ij}) * (W_2 * R_{kj})$$

where

| | |
|---|---|
| $RR_{kij}$ | Denotes a value indicating the degree of relevancy of $CPIO_k$ to $UDIO_i$ as it relates to user concept of interest $C_j$. |
| "$R_{ij}$" | Denotes a value indicating the degree of relevancy of $UDIO_i$ to user concept of interest $C_j$. |
| "$R_{kj}$" | Denotes a value indicating the degree of relevancy of $CPIO_k$ to user concept of interest $C_j$. |
| $W_1$ | Is a real-valued weight that expresses the relative importance assigned to the relevance value of a UDIO |
| $W_2$ | Is a real-valued weight that expresses the relative importance assigned to the relevance value of a CPIO |

Several other techniques known to those of skill in the art may also be used to determine the degrees of relevancy. A few such techniques have been described in U.S. patent application Ser. Nos. 08/995,616, 09/636,039, 09/483,092, and 09/483,094, the entire contents of which have been incorporated by reference for all purposes.

According to an embodiment of the present invention, the list of CPIOs along with their relevancy information may then be used for further processing according to step 616 described below wherein the results generated by the various selection techniques are combined to generate a single "final" list of one or more CPIO objects which is then communicated to the user system used by the user.

According to an alternative embodiment of the present invention, instead of communicating a single CPIO list, the lists generated by the various selection techniques may be communicated to the user system. In this embodiment, for each selection technique, server system 112 selects one or more CPIOs based on the relevancy information generated for the CPIOs using the particular selection technique (step 608). Various techniques may be used by server 112 to perform the selection of CPIOs. According to one technique, the selection is based on the degree of relevancy of the CPIOs to each UDIO as it relates to a particular user concept of interest, i.e. the selection is based on the value of "RR" shown in Table 3. Server system 112 may be configured to select only those CPIOs whose "RR" value is above a user-configurable threshold value. According to another technique, server system may be configured to select CPIOs based on the "RR" value and also based on the degree of relevancy of the UDIOs to the user concepts of interest (i.e. based on the value of "R" shown in Table 1 and 3). Other techniques may use other criteria for selection of the CPIOs. It should be apparent that various other selection techniques known to those skilled in the art may also be used in accordance with the present invention. The CPIOs selected in step 608 may then be communicated to user system 102 according to step 312 in FIG. 3.

As previously indicated, server 112 may also select CPIOs using a "class-based" or "type-based" selection technique as denoted by steps 610 and 612 in FIG. 6. As shown in FIG. 6, the class-based selection technique is initiated when server system 112 determines one or more comparison techniques to be applied to each UDIO based upon the class of the UDIO (step 610). As described above, the class or type of an information object indicates the type of content or information stored by the information object, and is usually determined when the information object is extracted (or generated). For example, class information for the UDIOs is determined in step 402 of FIG. 4.

In general, a comparison technique enables comparison between the content stored by the information objects. As previously described, various content recognition techniques may be applied to determine the content information of each information object. For example, according to an embodiment of the present invention, the content information for an UDIO is determined in step 406 of FIG. 4. One or more comparison techniques may be provided for each information object class. Accordingly, the comparison techniques determined by server 112 in step 610 to be applied to an UDIO depend on the type of the UDIO. Using a comparison technique, the server system compares contents of an UDIO with contents of a CPIO to determine the relevancy (a degree of relevancy or a relevance score) of the CPIO to the UDIO. Information related to the comparison techniques for the various classes may be stored in database 110.

Table 4 shown below provides examples of classes and comparison techniques corresponding to the classes according to an embodiment of the present invention.

TABLE 4

Comparison techniques for the various classes

| Class | Corresponding Comparison Techniques |
|---|---|
| Text | (1) Text comparison techniques |
| Image | (1) Text comparison techniques |
| | (2) Techniques which determine similarity between images |
| Audio | (1) Text comparison techniques which compare transcript(s) of audio information objects |
| | (2) Sound source comparison techniques |
| | (3) Sound similarity comparison techniques |
| Video | (1) Text comparison techniques |
| | (2) Techniques which determine similarity between keyframes |
| | (3) Text comparison techniques which compare transcript(s) of audio associated with the video information object |
| | (4) Sound source comparison techniques |

TABLE 4-continued

Comparison techniques for the various classes

| Class | Corresponding Comparison Techniques |
|---|---|
| | (5) Sound similarity comparison techniques |
| | (6) Video similarity comparison techniques |

As shown in Table 4, for a text class object, text comparison techniques may be used which compare the text associated with a text information object with text associated with other information objects. For example, for a text UDIO, text comparison techniques may compare the text associated with the UDIO with text associated with a CPIO.

For an image object, text comparison techniques, image similarity techniques, and other techniques known to those skilled in the art may be used. A text comparison technique compares the text associated with an image object with text associated with other information objects. For example, for an image UDIO, text comparison techniques may compare the text associated with the image UDIO with text associated with a CPIO. Image similarity techniques determine similarity between images associated with the information objects. For example, for an image UDIO, an image similarity technique compares the image associated with the image UDIO with images associated with CPIOs. Virage, Inc. of San Mateo, Calif., provides an image similarity application that may be used to compare images.

For an audio information object, text comparison techniques, sound source comparison techniques, sound similarity techniques, and other techniques known to those skilled in the art may be used. Text comparison techniques compare the text transcripts associated with an audio information object with text associated with other information objects. For example, for an audio UDIO, text comparison techniques may compare the text transcript associated with the audio UDIO with text associated with a CPIO. Sound source comparison techniques and sound similarity techniques compare sources of the audio signals stored by an audio information object. For example, a sound source comparison technique may compare the audio signals of an audio UDIO with the audio signals of an audio CPIO to determine the degree of similarity of the audio sources.

All of the comparison techniques associated with a text information object, an image information object, and an audio information object, along with video comparison techniques may be applied to compare video information objects. For example, text comparison techniques may be used to compare text transcripts associated with a video information object, image comparison techniques may be used to compare images or keyframes associated with a video information object (e.g. applications provided by Virage, Inc. which compare similarity between video frames), and audio comparison techniques may be used to compare audio signals associated with the video information object. Video comparison techniques may also be used to compare video signals associated with the video object. The above-mentioned comparison techniques for a video information object may be used to compare a video UDIO and other CPIOs.

It should be apparent that the scope of the present invention is not limited to the techniques shown in the Table 4. Various other comparison techniques known to those skilled in the art may also be used to compare the contents of information objects (including various other types of information objects not shown in Table 4).

Referring back to FIG. 6, for each UDIO, each comparison technique associated with the type of the UDIO and determined in step 610 is applied to determine relevancy scores between the UDIO and the CPIOs (step 612). Accordingly, for a particular UDIO, the output of step 612 may comprise a list of CPIOs for each comparison technique and a relevancy score indicating the relevancy of each CPIO and the particular UDIO for a particular matching technique. According to an embodiment of the present invention, the output of step 612 may be stored in a table such as Table 5 shown below:

TABLE 5

| UDIO | Class | Comparison Techniques | List of relevant CPIOs and relevancy scores |
|---|---|---|---|
| $UDIO_1$ | Class X | Technique #1 | $<(CPIO_1, RRR_{111}), (CPIO_2, RRR_{211}), \ldots>$ |
| | | Technique #2 | $<(CPIO_1, RRR_{121}), (CPIO_2, RRR_{221}), \ldots>$ |
| $UDIO_2$ | Class Y | Technique #1 | $<(CPIO_1, RRR_{112}), (CPIO_2, RRR_{212}), \ldots>$ |
| | | Technique #4 | $<(CPIO_1, RRR_{142}), (CPIO_2, RRR_{242}), \ldots>$ |
| | | Technique #5 | $<(CPIO_1, RRR_{152}), (CPIO_2, RRR_{252}), \ldots>$ |
| ... | ... | ... | ... |
| $UDIO_n$ | Class X | Technique #1 | $<(CPIO_1, RRR_{11n}), (CPIO_2, RRR_{21n}), \ldots>$ |
| | | Technique #2 | $<(CPIO_1, RRR_{12n}), (CPIO_2, RRR_{22n}), \ldots>$ | where:

"$RRR_{xyz}$"—Indicates a degree of relevancy of $CPIO_x$ to $UDIO_z$ determined by applying comparison technique "y" (Technique #y).

In the embodiment shown above, Table 5 comprises four columns. The first column identifies a UDIO (e.g. $UDIO_1$ indicates the first user document information object). The second column indicates the class or type of the UDIO identified in first column (e.g. $UDIO_1$ is of class "X," $UDIO_2$ is of class "Y," and $UDIO_n$ is also of class "X."). The third column identifies the comparison techniques corresponding to the class identified in the second column (e.g. two comparison techniques are associated with class "X", namely technique #1 and technique #2; three comparison techniques apply to class "Y", namely techniques #1, #4, and #5, and so on). For each comparison technique identified in the third column, the fourth column contains a list of CPIOs and relevancy scores of the CPIOs to the UDIO object (identified in the first column) determined by applying the comparison technique identified in the third column.

Several different techniques may be used by the present invention to determine the RRR scores. According to a specific technique, for each UDIO of a given class, server 112 applies a comparison technique associated with the class of the UDIO to each CPIO which has a similar comparison technique associated with it. For example, for a text UDIO, a text comparison technique associated with the text class can be applied to image CPIOs, audio CPIOs, video CPIOs, and CPIOs of other types which have a text comparison technique associated with them to compare the text transcripts associated with the information objects. An UDIO of a first class and a CPIO of a second class (which may or may not be the same class as the first class) are said to be compatible for a particular comparison technique if that particular comparison technique is associated with the first and the second class. Accordingly, if a UDIO is a text object then it is compatible with CPIOs of classes that have a corresponding text comparison technique. For example, if a UDIO is of type image, and an image similarity comparison technique is being used, then image CPIOs and video CPIOs are compatible since there is a corresponding image similarity comparison technique associated with the image and video classes. For an audio UDIO, if a sound source comparison technique is being used, then CPIOs that are either audio or video objects are compatible since there is an corresponding sound source comparison technique associated with each of those classes. The compatibility of a UDIO and CPIO for a given comparison technique can be determined by consulting the information stored in Table 4.

For two compatible information objects, the relevance score RRR generated by applying the particular comparison technique is associated with the CPIO for the particular UDIO and the particular comparison technique and stored in memory (e.g. in Table 5). For example, server 112 may use a sound source comparison technique to compare sound sources in an audio UDIO with sound sources in audio or video CPIOs. Using the sound source comparison technique, server 112 determines unique sound sources (e.g. speakers) by analyzing passages of speech data in the audio UDIO and compares each sound source to sound sources determined in the compatible CPIOs. For a particular compatible CPIO, when server 112 determines that a sound source in the UDIO occurs in the CPIO, a confidence score associated with the particular CPIO is incremented. After all the passages in the particular UDIO have been compared in this way to sound sources in the particular CPIO, the average confidence score for the particular CPIO is calculated by dividing the aggregated confidence score for the CPIO by the number of speakers identified in the particular UDIO. The average confidence score is output as the relevance RRR value of the particular CPIO to the UDIO for the sound source comparison technique.

According to an embodiment of the present invention, the above-described procedure may be described by the following pseudo-code:

```
UDIO_y__Speakers = Speakers identified in audio UDIO_y;
#UDIO_y__Speakers = Number of Speakers in UDIO_y__Speakers;
CPIO_x__Speakers = Speaker identified in compatible CPIO_x;
confidence_score = 0; //Initialize to zero
for each Speaker in UDIO_y__Speakers {
    By applying Technique#z determine if Speaker is included in
    CPIO_x__Speakers;
    if Speaker is included in CPIO_x__Speakers {
        confidence_score = confidence_score + 1;
    }
}
RRR_xyz = confidence_score/#UDIO_y__Speakers;
```

If the UDIO and CPIO are not compatible for a given comparison technique (e.g. a text CPIO is not compatible with a video UDIO for a video comparison technique), the value of RRR associated with the CPIO may be set to zero.

Several other techniques known to those of skill in the art may also be used to determine the degrees of relevancy. Examples of other methods for determining the relevancy scores have been described in U.S. patent application Ser. Nos. 08/995,616, 09/636,039, 09/483,092, and 09/483,094, the entire contents of which have been incorporated by reference for all purposes.

After all the UDIO objects have been processed, according to an embodiment of the present invention, the list of CPIOs along with their relevancy information may then be used for further processing according to step 616 described below wherein the results generated by the various selection techniques are combined to generate a single "final" list of one or more CPIOs which is then communicated to the user system used by the user.

According to an alternative embodiment of the present invention, instead of communicating a single CPIO list, the results of the various selection techniques may be communicated to the user system. In this embodiment, server system 112 selects one or more CPIOs based on the relevancy information generated for the CPIOs (step 614). Various techniques may be used by server 112 to select the CPIOs. According to one technique, the selection is based on the degree of relevancy of the CPIOs to each UDIO for a particular comparison technique, i.e. the selection is based on the value of "RRR" shown in Table 5. Server system 112 may be configured to select only those CPIOs whose "RRR" value is above a user-configurable threshold value. Other techniques may use other criteria for selection of the CPIOs. It should be apparent that various other selection techniques may also be used in accordance with the present invention. The CPIOs selected in step 614 may then be communicated to user system 102 according to step 312 in FIG. 3.

As described above, according to an embodiment of the present invention, the results of one or more selection techniques (such as class-based selection techniques and concept-based selection techniques) are combined to form a single "final" list of CPIOs (step 616) which is then communicated to user system 102 according to step 312 in FIG. 3. According to the teachings of the present invention, various combination techniques may be used by server 112 to combine the various CPIOs into one "final" list. Each combination technique takes as input CPIOs and their associated relevancy information (relevancy scores) generated by applying the various selection techniques, and outputs a single list of, possibly ranked, one or more CPIOs. The CPIOs included in the single "final" list of CPIOs may be selected based upon criteria such as concepts of interest to the user, the context in which the user is viewing the user document, contents of the document (or sections thereof) viewed by the user, contents of the CPIOs, relevancy information, and the like. By appropriately configuring the combination technique, the class(es) of information objects may also be used as criteria for generating the final combined list of CPIOs. The CPIOs included in the final single combined list of CPIOs are then communicated to user system 102 according to step 312 in FIG. 3.

Figure 7:
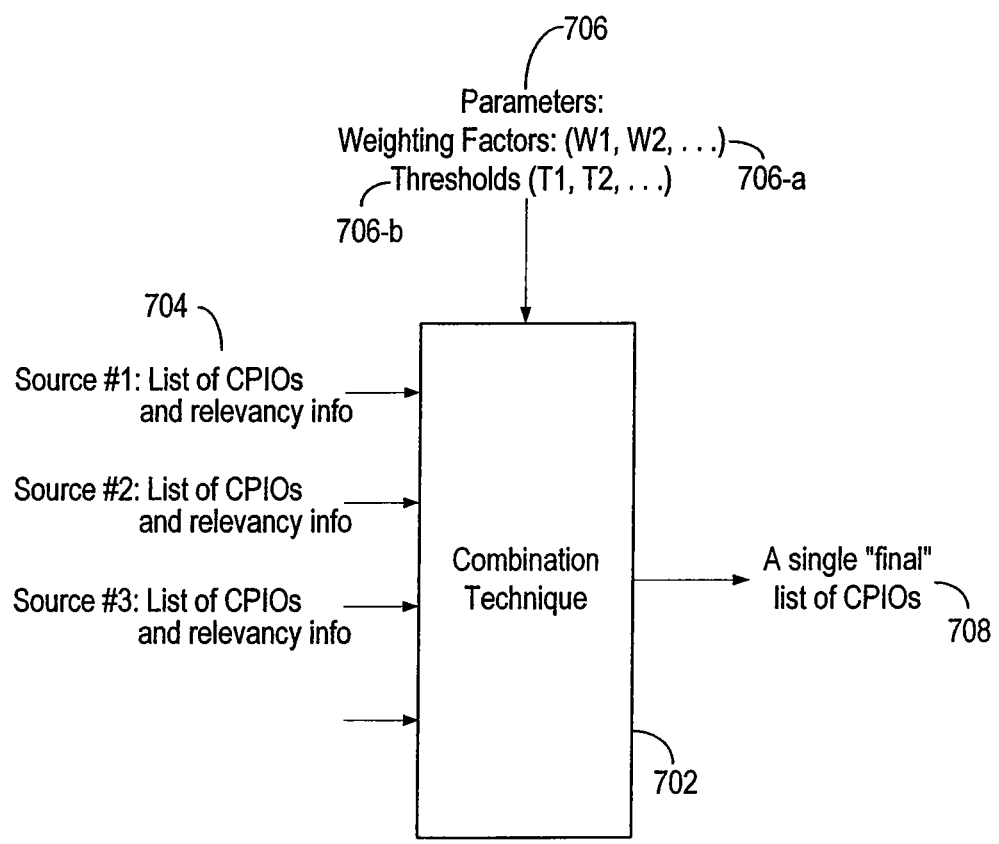
FIG. 7 is a simplified block diagram showing the inputs and outputs of a source-based combination technique according to an embodiment of the present invention.

According to an embodiment of the present invention, a "source-based" combination technique is used to combine the results of the various selection techniques to generate a single list of, possibly ranked, CPIOs. FIG. 7 is a simplified block diagram showing the inputs and outputs of a source-based combination technique according to an embodiment of the present invention. As shown in FIG. 7, the source-based combination technique 702 takes as input CPIOs and their associated relevancy information (scores) generated by one or more "sources". Input 704 to combination technique 702 (as shown in FIG. 7) may be represented as follows:

Source#1→ListElement#1, ListElement#2, . . .
Source#2→ListElement#1, ListElement#2, . . .
Source#3→ListElement#1, ListElement#2, . . .

and so on wherein each ListElement comprises a CPIO and a value indicating the degree of relevance or relevance score of the CPIO to the source. For example, each list element may be represented as ListElement$_b$=(CPIO$_a$, Rel$_{ab}$)

where,

ListElement$_b$—indicates a ListElement belonging to a list corresponding to Source#b.
CPIO$_a$—identifies a CPIO; and $Rel_{ab}$—indicates the relevance of $CPIO_a$ to Source#b.

The combination technique 702 outputs a single (possibly ordered) list 708 of CPIOs based on user-configurable parameters 706 associated with the combination technique.

According to an embodiment of the present invention, each "source" identifies a UDIO and information related to a selection technique applied to the UDIO. Accordingly, a source may be represented as shown below according to an embodiment of the present invention:

Source=(UDIO, SelectionMethodInfo)

where:

UDIO—Identifies a UDIO; and

SelectionMethodInfo—Identifies information about a selection technique (or a particular aspect of a selection technique) applied to the UDIO to generate the relevancy information for one or more CPIOs associated with the source.

For a concept-based selection technique described above, the SelectionMethodInfo field may identify a user concept. Accordingly, for a concept-based selection method, a source may be identified by a combination of an UDIO and a concept of interest to the user as follows:

Source=(UDIO, UserConcept)

Examples of sources for a concept-based selection technique may include (UDIO#1, UserConcept="Travel in Paris"), (UDIO#1, UserConcept="Football"), (UDIO#2, "Presidential Elections"), and so on. For example, the first two columns of Table 3 in conjunction identify a source, and column four of Table 3 identifies CPIOs and associated relevancy scores included in the list elements associated with the source.

For a class-based selection technique, the SelectionMethodInfo field may identify the class of a particular UDIO and a particular comparison technique applied to the UDIO to generate CPIOs and their relevancy scores for the particular class of UDIO using the particular comparison technique. Accordingly, for a class-based selection method, a source may be represented by:

Source=(UDIO, (Class_of UDIO, Comparison Technique)).

Examples of sources generated by a class-based selection technique may include (UDIO#1, (Class="Text Object", ComparisonTechnique="Text comparison")), (UDIO#2, (Class="Audio Object", ComparisonTechnique="Sound source comparison")), (UDIO#2, (Class="Audio Object", ComparisonTechnique="Text comparison")), (UDIO#2, (Class="Video Object", ComparisonTechnique="Video comparison")), and the like. For example, the first three columns of Table 5 in conjunction identify a source, and column four of Table 3 identifies CPIOs and associated relevancy scores included in the list elements associated with the source.

Accordingly, for a source (UDIO, UserConcept) (i.e. a source for a concept-based selection technique for a particular UDIO as it relates to a particular user concept of interest), the $Rel_{ab}$ value for each ListElement associated with the source indicates the relevance of a $CPIO_a$ to the UDIO and user concept indicated by the source (i.e. $Rel_{ab}$ corresponds to the value of "RR"). For a source (UDIO, (Class_of_UDIO, Comparison Technique)) (i.e. a source for a class-based selection technique for a particular UDIO of a particular class and a comparison technique associated with the class), the $Rel_{ab}$ value for each ListElement indicates the relevance of a $CPIO_a$ to the UDIO of the type generated using the particular comparison technique (i.e. $Rel_{ab}$ corresponds to the value of "RRR" depicted in Table 5).

As shown in FIG. 7, one or more user-configurable parameters 706 may be input to the combination technique to facilitate the combination process. These parameters 706 may include one or more "weighting factors" 706-*a*, thresholds 706-*b*, etc. A "weighting factor" may be associated with combination criterion, e.g., a weighing factor may be associated with a particular source to specify the importance of the particular source. For example, if the user would like to increase the chances of a CPIO for a particular source being selected in the "final" list, the user may associate a high weighting factor value with the particular source to emphasize the significance of the source. A threshold relevance value may also be associated with combination criteria. e.g., a threshold may be associated with a particular source to indicate a minimum degree of relevancy value for a CPIO to be selected in the final single list. For example, a user may associate a first threshold with a first source, and as a result, only those CPIOs whose relevancy scores are above the first threshold and which are included in the list elements for the particular source will be selected for inclusion in the single "final" list.

Accordingly, weighting factors 706-*a* and thresholds 706-*b* allow a user to customize the manner in which combination technique 702 will select and possibly rank CPIOs in the final list of CPIOs. For example, by setting appropriate weighting factors and thresholds, the user may emphasize the significance of a particular source, emphasize the significance of a particular concept of interest to the user, emphasize the significance of a particular type of information object, and the like.

Figure 8:
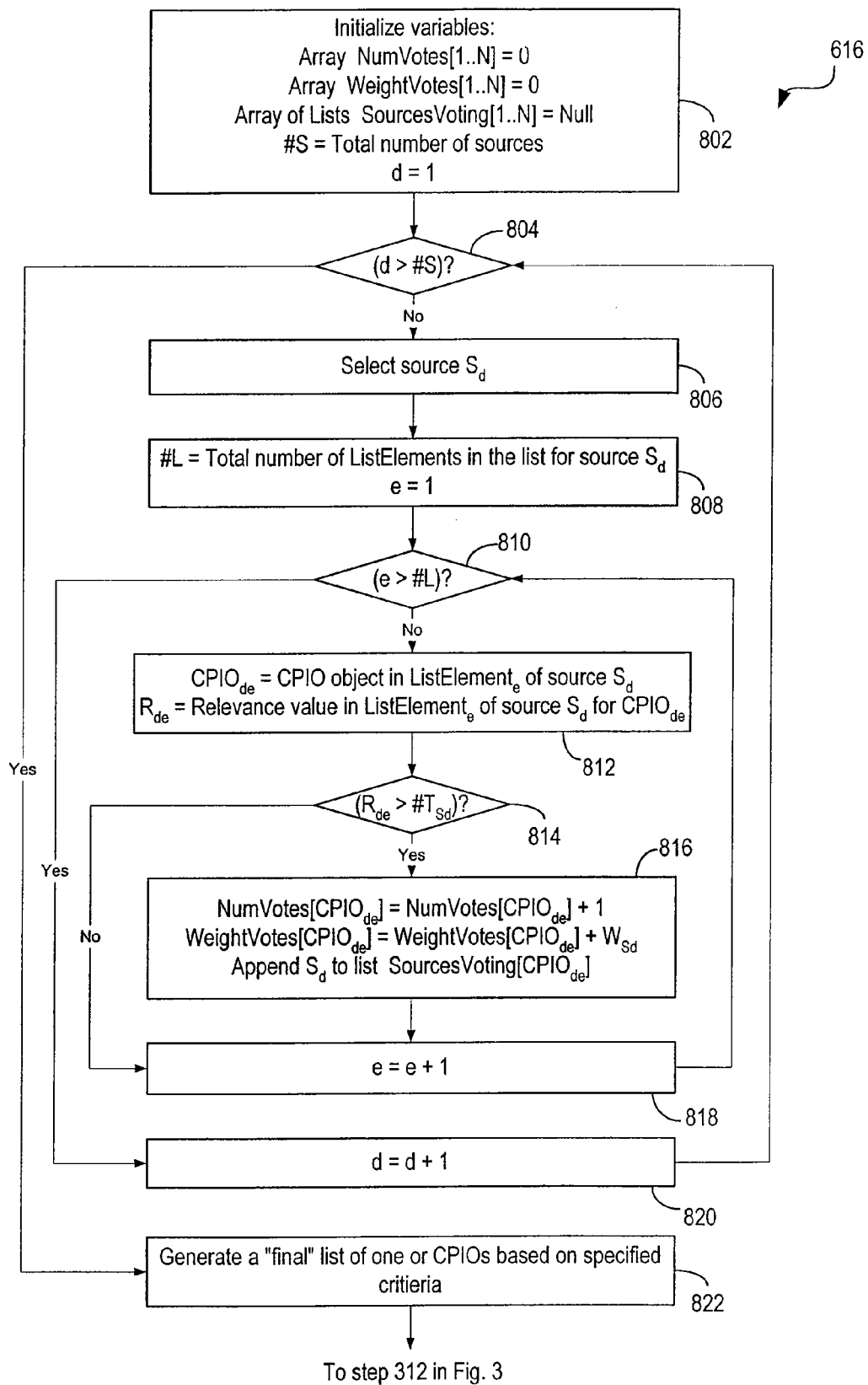
FIG. 8 is a simplified high-level flowchart showing processing performed for generating a single "final" list of CPIOs according to an embodiment of the present invention.

FIG. 8 is a simplified high-level flowchart showing processing performed during step 616 of FIG. 6 for generating a single "final" list of CPIOs according to an embodiment of the present invention. The flowchart depicted in FIG. 8 is merely illustrative of an embodiment incorporating the present invention and does not limit the scope of the invention as recited in the claims. One of ordinary skill in the art would recognize other variations, modifications, and alternatives. According to an embodiment of the present invention, the method depicted in FIG. 8 is performed by modules executing on server system 112. These modules may include software modules, hardware modules, or combinations thereof.

As shown in FIG. 8, the method is initiated by initializing various variables that will be used for the computation (step 802). According to an embodiment of the present invention, these variables may include (a) an array "NumVotes" comprising "N" elements, where "N" is the total number of CPIOs, wherein each element of the array corresponds to a particular CPIO; (b) an array "WeightVotes" comprising "N" elements, wherein each element of the array corresponds to a particular CPIO; (c) an array of lists "SourcesVoting" comprising "N" elements where each element of the array points to a list of CPIOs; (d) a variable "#S" which is initialized to the total number of sources to be processed; and (e) a counter variable "d" which is initialized to one and is used to traverse the sources.

The "NumVotes" array is used to record the number of times that a particular CPIO was considered to be included in the "final" single list of CPIOs. Accordingly, an element of array "NumVotes" corresponding to a particular CPIO indicates the number of times that the particular CPIO was considered by the combination algorithm to be included in the "final" single list of CPIOs. Each element of the "WeightVotes" array corresponding to a particular CPIO accumulates the "weighting factor" as applied to the source for the particular CPIO. Each element of the "SourcesVoting" array corresponding to a particular CPIO points to a list which indicates the sources which contributed to that particular CPIO.

After the various variables have been initialized, processing of the sources is then commenced. Server 112 determines if there are any unprocessed sources (step 804). This may be accomplished by checking if the value of the "d" variable is greater than the "#S" variable value. If the value of the "d" variable is greater than the value of the "#S" variable, it indicates that all the sources have been processed and processing continues with step 822. However, if the value of the "d" variable is not greater than the "#S" variable, it indicates the existence of unprocessed sources and processing continues with step 806. Accordingly, the "d" variable is used to traverse through the available sources and process them one at a time.

In step 806, the present invention selects a particular source ($S_d$ indicating the $d^{th}$ source) for processing. Variables used for processing the list elements for the source $S_d$ selected in step 806 are then initialized (step 808). According to an embodiment of the present invention, these variables may include (a) a variable "#L" which is initialized to the number of elements (ListElements) in the list corresponding to source $S_d$; and (b) a counter variable "e" which is initialized to one and which is used to traverse the elements in the list corresponding to source $S_d$.

Server system 112 then determines if there are any unprocessed elements in the list of elements corresponding to the source ($S_d$) selected in step 806 (step 810). This may be accomplished by checking if the value of the "e" variable is greater than the "#L" variable value. If the value of the "e" variable is greater than the value of the "#L" variable, it indicates that all the list elements have been processed and processing continues with step 820 wherein the value of the "d" variable is incremented by one to select the next source. However, if the value of the "e" variable is not greater than the "#L" variable, it indicates the existence of unprocessed list elements and processing continues with step 812. Accordingly, the "e" variable is used to traverse through the list elements for a particular source and process the list elements one at a time.

In step 812, the "$CPIO_{de}$" variable is initialized to point to the CPIO referenced by the $e^{th}$ list element in the list for source $S_d$, and the "$R_{de}$" variable is initialized to store or refer to the relevance value or score associated with CPIO referenced by the $e^{th}$ list element in the list for source $S_d$. The value of $R_{de}$ is then checked to determine if it is greater than a user-configurable value $T_{Sd}$ (step 814), where $T_{Sd}$ indicates a threshold value configured by the user for source $S_d$. If the value of $R_{de}$ is not greater that the value of $T_{Sd}$, the $e^{th}$ list element is not considered for inclusion in the "final" list of CPIOs (i.e. the list element is skipped) and processing continues with step 818 wherein the value of "e" is incremented by one to select the next list element from the list corresponding to source $S_d$. If the value of $R_{de}$ is greater that the value of $T_{Sd}$, it indicates that the particular CPIO included in the $e^{th}$ list element is to be considered for inclusion in the "final" single list and processing continues with step 816.

In step 816, the value of the element of array "NumVotes" corresponding to the CPIO indicated by variable $CPIO_{de}$ is incremented by one. The value of the element of array "WeightVotes" corresponding to the CPIO indicated by variable $CPIO_{de}$ is incremented by the user-configurable weighting factor ($W_{Sd}$) associated with source $S_d$. Information identifying source $S_d$ is also appended to the list pointed to by the element of array "SourcesVoting" corresponding to the CPIO indicated by variable $CPIO_{de}$. Processing then continues with step 818 wherein the value of "e" is incremented by one to select the next list element from the list corresponding to source $S_d$.

After all the sources and their corresponding list elements have been processed (as determined by step 804), a "final" single list of CPIOs is generated based on user-specified criteria and information recorded in the "NumVotes," "WeightVotes," and "SourcesVoting" arrays (step 822). According to an embodiment of the present invention, the user-specified criteria may configure the present invention to select CPIOs to be included in the "final" list based on information stored in the "WeightVotes" array. For example, only those CPIOs having WeightVotes values above a user-configurable threshold may be selected for inclusion in the "final" list. Alternatively, the "WeightVotes" array may be sorted and CPIOs corresponding to the top "G" (where the value of "G" is user-configurable) WeightVotes values may be selected for inclusion in the "final" single list of CPIOs to be communicated to user system 102. In other embodiment, server system 112 may be configured to select CPIOs based on information contained in the "NumVotes" array. For example, in this embodiment, only those CPIOs having NumVotes values above a user-configurable threshold are selected for inclusion in the "final" list of CPIOs. Alternatively, the "NumVotes" array may be sorted and CPIOs corresponding to the top "H" (where the value of "H" is user-configurable) NumVotes values may be selected for inclusion in the "final" list to be communicated to user system 102.

CPIOs may also be selected based upon the sources that contributed the CPIOs. For example, the present invention may be configured to select a CPIO based upon information contained in the lists pointed to by elements of the "SourcesVoting" array. The user may also specify selection criteria that is based on a combination of information stored in the NumVotes, WeightVotes, and/or SourcesVoting arrays. It should be apparent that the scope of the present invention is not restricted to the selection criteria/techniques discussed above. Various other techniques known to those of ordinary skill in the art may also be used to select CPIOs to be included in the final single list of CPIOs to be communicated to the user system.

The "final" single list of one or more CPIOs generated in step 822 may then be communicated to user system 102 according to step 312 in FIG. 3. The information stored by the CPIOs included in the "final" list may then be output to the user by user system 102 (step 314 in FIG. 3).

Figure 9A:
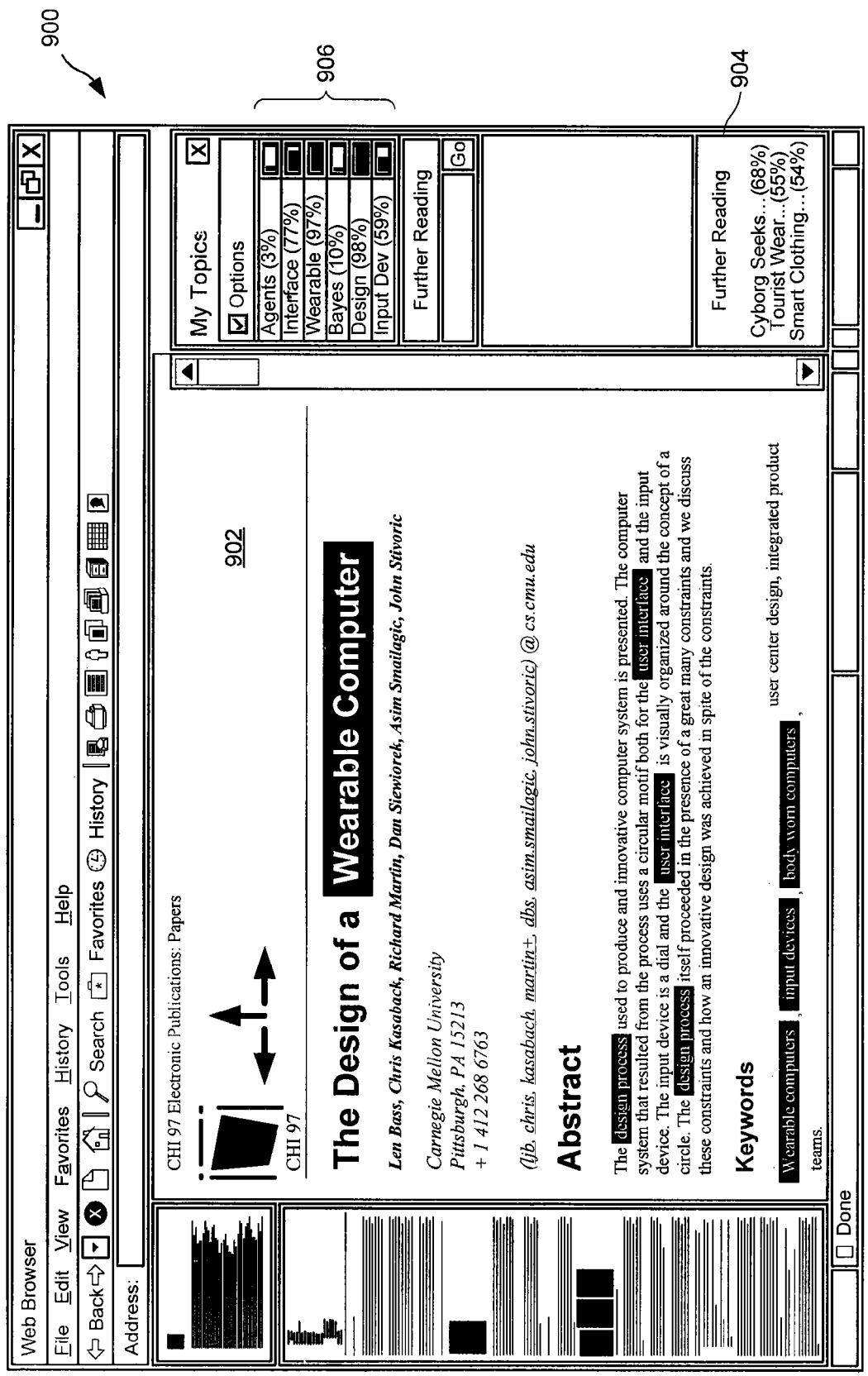
FIGS. 9A, 9B, and 9C are examples of user interfaces which may be used to output information stored by the selected CPIOs to the user according to embodiments of the present invention.
Figure 9B:
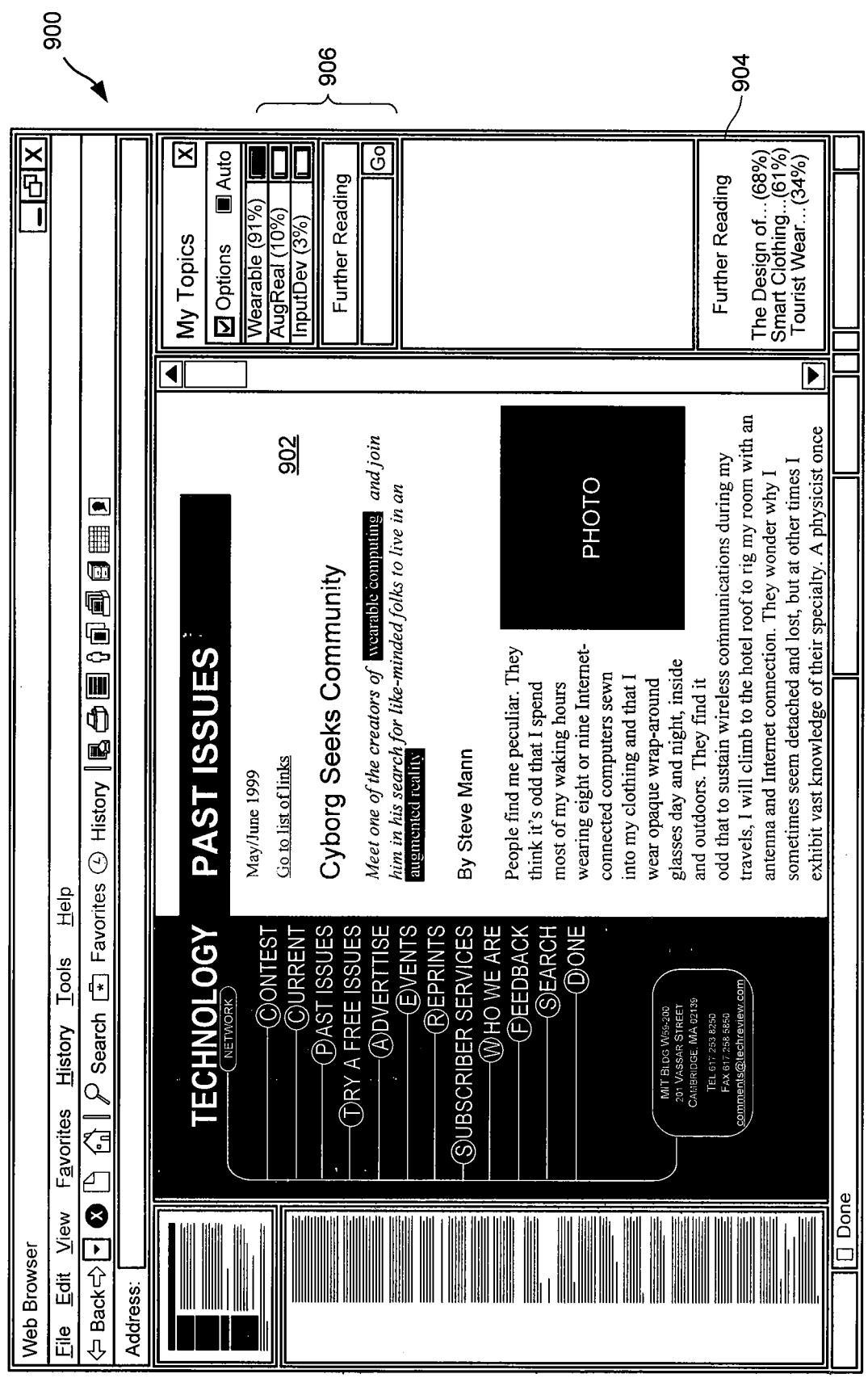
Figure 9C:
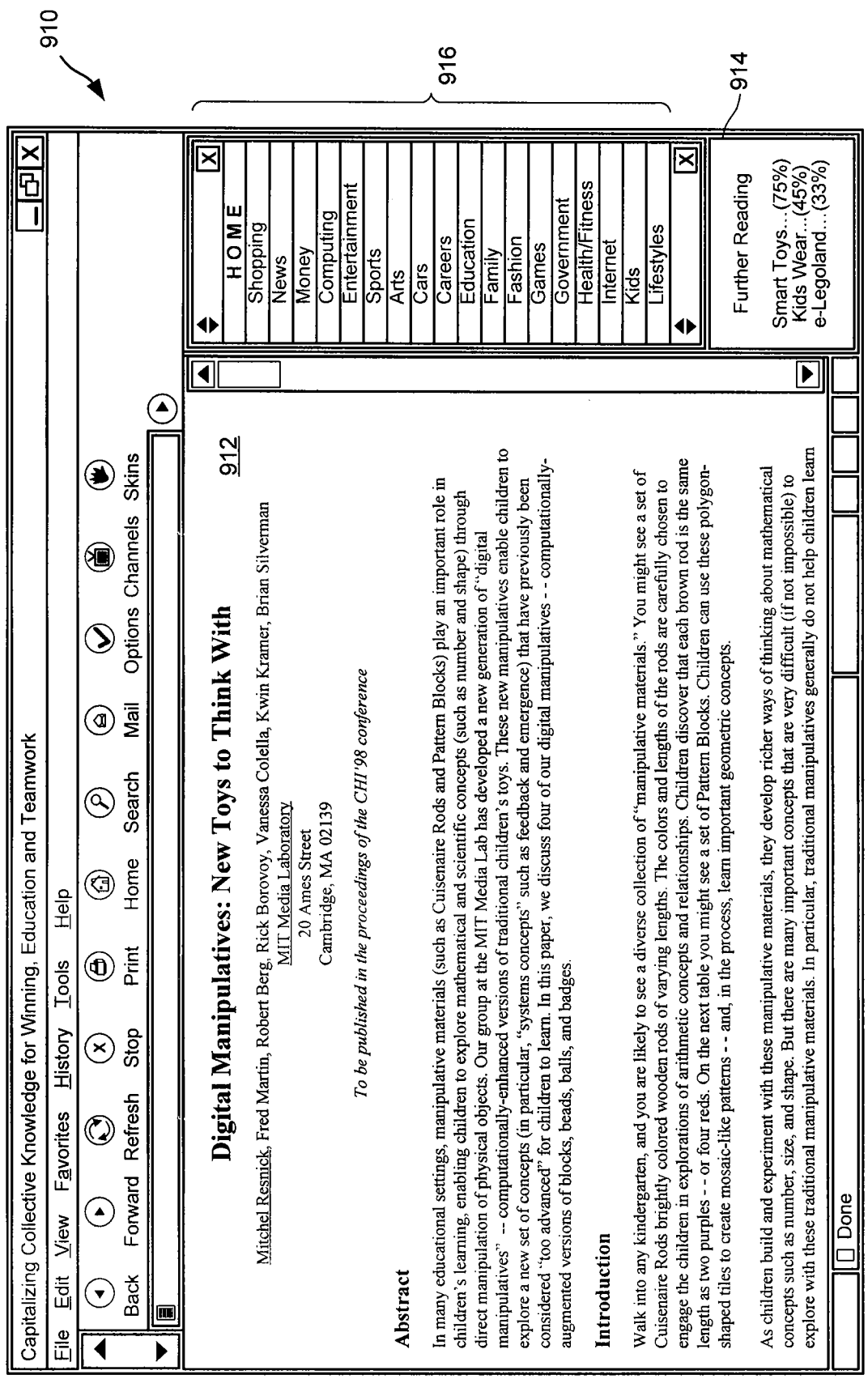

FIGS. 9A, 9B, and 9C depict examples of user interfaces which may be used to present or output information stored by the selected CPIOs to the user according to embodiments of the present invention. The user interfaces depicted in FIGS. 9A, 9B, and 9C are mere examples and should not be construed to limit the scope of the claims herein. One of ordinary skill in the art would recognize many other variations, alternatives, and modifications.

FIG. 9A depicts a browser screen 900 having a current document display area 902 and a selected information display area 904. The document viewed by the user is displayed in current document display area 902. For example, in FIG. 9A, the user is viewing a document entitled, "The Design of a Wearable Computer."

Selected information display area 904 is used to display information stored by CPIOs selected by server system 112 and communicated to the user system in accordance with the teachings of the present invention. The information displayed in selected information display area 904 may include text information, image information, audio information, video information, URL information, and other types of information and combinations thereof. The information displayed in selected information display area 904 may have been selected by server 112 using one or more of the selection techniques described above. For example, in FIG. 9A, the information displayed in area 904 includes text and URL links that are determined by server 112 to be relevant in some way to the document viewed by the user and to concepts of interest to the user. The URL links includes links to documents entitled "Cyborg Seeks . . . " "Tourist Wear . . . " and "Smart Clothing . . . " which may be of interest to the user. In this specific embodiment, the document names have been shortened to accommodate the size of information display area 904. However, the content and the display arrangement of the information may vary in alternative embodiments of the present invention. Further, the number of selected information display areas may also vary in alternative embodiments of the present invention.

In the embodiment depicted in FIG. 9A, area 906 displays concepts of interest to the user of the user system. As described above, this information may be stored in a user profile. In the example depicted in FIG. 9A, the user concepts of interest include concepts identified by content identifiers "Agents," "Interfaces," "Wearable," "Bayes," "Design," and "InputDev". For each concept, the user interface also indicates the degree of relevancy of the document viewed by the user in area 902 to the concepts of interest. For example, the document viewed by the user is 97% relevant to the concept identified by concept identifier "Wearable". It should be apparent the user concepts need not be displayed in alternative embodiments of the present invention.

The user may make selections from the information displayed in selected information display area 904. For example, selection of URL link "Cyborg Seeks . . . " in FIG. 9A causes the web page entitled "Cyborg Seeks Community" corresponding to the selected URL to be loaded in area 902 of browser 900 as depicted in FIG. 9B. The information displayed in selected information display area is also dynamically updated to display information that is relevant to the "new" document displayed in area 902. In this embodiment, a change in the document viewed by a user causes server 112 to select CPIOs based upon the "new" document. Selected information display area is updated to display information stored in CPIOs selected by server system 112 and communicated to the user system. Accordingly, as shown in FIG. 9B, new information is displayed in selected information display area 904. Concept indicators displayed in are 906 are also updated to provide indications of relevance of the current document, "Cyborg Seeks Community," to the plurality of concepts that are of interest to the user.

FIG. 9C depicts yet another user interface according to another embodiment of the present invention. FIG. 9C depicts a browser screen 910 having a current document display area 912 and a selected information display area 914. The document viewed by the user is displayed in current document display area 902. For example, in FIG. 9C, the user is viewing a document entitled, "Digital Manipulatives: New Toys To Think With."

In the embodiment depicted in FIG. 9C, area 916 displays a plurality of channels of interest to the user. Information related to the channels may be stored in a user profile. In the embodiment depicted in FIG. 9C, the channels include a shopping channel, a news channel, a money channel, and others. Different channels can be specified in other embodiments. Selected information display area 914 is used to display information stored by CPIOs selected by server system 112 in accordance with the teachings of the present invention based upon the document viewed by the user in area 912 and based upon channels of interest to the user displayed in area 916. For example, in FIG. 9C, the information displayed in area 904 includes information that is relevant in some way to the document viewed by the user and channels of interest to the user and of possible interest to the user.

As described above, the present invention provides techniques for automatically providing information to users based upon information or documents accessed or viewed by the user. Since the present invention does not require specific user input to find the relevant information, the invention can be easily used to users who are not computer literate or are uncomfortable using computers. Further, the present invention allows content providers to target information to users who are likely to be interested in the information. The present invention can thus be used as a powerful advertising tool for targeting advertisement information to users. The present invention may also be used for various other applications that provide information to users.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of providing information to a user based upon contents of a first document displayed to the user, the method comprising:

identifying, by a computer system, at least a first section of the first document;

extracting, by the computer system, a first set of one or more information objects from the first section of the first document;

applying, by the computer system, a first selection technique to generate a first set of relevancy scores for information objects in a second set of information objects distinct from the first set of information objects, the first set of relevancy scores indicating the relevancy of information objects in the second set of information objects to information objects in the first set of information objects calculated using the first selection technique, the first selection technique being based on relevance of information objects in the first and second sets of information objects to concepts of interest to the user;

applying, by the computer system, a second selection technique to generate a second set of relevancy scores for information objects in the second set of information objects, the second set of relevancy scores indicating the relevancy of information objects in the second set of information objects to information objects in the first set of information objects calculated using the second selection technique, the second selection technique being based on classes of information objects in the first and second sets of information objects, the classes of information objects including text, audio, or video; and selecting, by the computer system, a third set of one or more information objects from information objects in the second set of information objects based upon the first set of relevancy scores generated using the first selection technique and the second set of relevancy scores generated using the second selection technique, wherein information objects in the third set of information objects store information to be output to the user when the first document is being displayed to the user.

2. The method of claim 1, wherein the first set of information objects comprises at least a first information object including information of a first type, and wherein the second set of information objects comprises at least one information object including information of a second type, wherein the second type is different from the first type.

3. The method of claim 1 wherein the first section of the first document corresponds to a section of the first document displayed to the user, wherein the section of the first document displayed to the user is less than the entire first document.

4. The method of claim 1 wherein extracting the first set of information objects from the first section of the first document comprises:

for each information object in the first set of information objects:
identifying a type of the information object based upon contents of the information object;
determining a first content recognition technique based upon the type of the information object; and
applying the first content recognition technique to the information object to determine information related to the contents of the information object.

5. The method of claim 1 wherein selecting the third set of one or more information objects from the second set of information objects based upon the first set of relevancy scores and the second set of relevancy scores comprises:

for each information object in the second set of information objects:
calculating an aggregate relevancy score for the information object by aggregating a relevancy score in the first set of relevancy scores generated for the information object by applying the first selection technique and a relevancy score in the second set of relevancy scores generated for the information object by applying the second selection technique; and
selecting the information object to be included in the third set of information objects if the aggregate relevancy score calculated for the information object is above a threshold value.

6. A computer readable storage medium having stored thereon program code executable by a computer system, the program code comprising:

code for identifying at least a first section of a first document;

code for extracting a first set of one or more information objects from the first section of the first document;

code for applying a first selection technique to generate a first set of relevancy scores for information objects in a second set of information objects distinct from the first set of information objects, the first set of relevancy scores indicating the relevancy of information objects in the second set of information objects to information objects in the first set of information objects calculated using the first selection technique, the first selection technique being based on relevance of information objects in the first and second sets of information objects to concepts of interest to the user;

code for applying a second selection technique to generate a second set of relevancy scores for information objects in the second set of information objects, the second set of relevancy scores indicating the relevancy of information objects in the second set of information objects to information objects in the first set of information objects calculated using the second selection technique, the second selection technique being based on classes of information objects in the first and second sets of information objects, the classes of information objects including text, audio, or video; and code for selecting a third set of one or more information objects from information objects in the second set of information objects based upon the first set of relevancy scores generated using the first selection technique and the second set of relevancy scores generated using the second selection technique, wherein information objects in the third set of information objects store information to be output to a user when the first document is being displayed to the user.

7. The computer readable storage medium of claim 6, wherein the first set of information objects comprises at least a first information object comprising including information of a first type, and wherein the second set of information objects comprises at least one information object including information of a second type, wherein the second type is different from the first type.

8. The computer readable storage medium of claim 6 wherein the code for extracting the first set of information objects from the first section of the first document comprises:

for each information object in the first set of information objects:
code for identifying a type of the information object based upon contents of the information object;
code for determining a first content recognition technique based upon the type of the information object; and
code for applying the first content recognition technique to the information object to determine information related to the contents of the information object.

9. The computer readable storage medium of claim 6 wherein the code for selecting the third set of one or more information objects from the second set of information objects based upon the first set of relevancy scores and the second set of relevancy scores comprises:

for each information object in the second set of information objects:
code for calculating an aggregate relevancy score for the information object by aggregating a relevancy score in the first set of relevancy scores generated for the information object by applying the first selection technique and a relevancy score in the second set of relevancy scores generated for the information object by applying the second selection technique; and
code for selecting the information object to be included in the third set of information objects if the aggregate relevancy score calculated for the information object is above a threshold value.

10. A system for providing information to a user based upon contents of a first document displayed to the user, the system comprising:
- a processor;
- a memory coupled to the processor, the memory configured to store a plurality of code modules for execution by the processor, the plurality of code modules comprising:
  - a code module for identifying at least a first section of the first document;
  - a code module for extracting a first set of one or more information objects from the first section of the first document;
  - a code module for applying a first selection technique to generate a first set of relevancy scores for information objects in a second set of information objects distinct from the first set of information objects, the first set of relevancy scores indicating the relevancy of information objects in the second set of information objects to information objects in the first set of information objects calculated using the first selection technique, the first selection technique being based on relevance of information objects in the first and second sets of information objects to concepts of interest to the user;
  - a code module for applying a second selection technique to generate a second set of relevancy scores for information objects in the second set of information objects, the second set of relevancy scores indicating the relevancy of information objects in the second set of information objects to information objects in the first set of information objects calculated using the second selection technique, the second selection technique being based on classes of information objects in the first and second sets of information objects, the classes of information objects including text, audio, or video; and
  - a code module for selecting a third set of one or more information objects from information objects in the second set of information objects based upon the first set of relevancy scores generated using the first selection technique and the second set of relevancy scores generated using the second selection technique, wherein information objects in the third set of information objects store information to be output to the user when the first document is being displayed to the user.

11. The system of claim 10, wherein the first set of information objects comprises at least a first information object including information of a first type, and wherein the second set of information objects comprises at least one information object including information of a second type, wherein the second type is different from the first type.

12. The system of claim 10 wherein the code module for extracting the first set of information objects from the first section of the first document comprises:
- for each information object in the first set of information objects:
  - a code module for identifying a type of the information object based upon contents of the information object;
  - a code module for determining a first content recognition technique based upon the type of the information object; and
  - a code module for applying the first content recognition technique to the information object to determine information related to the contents of the information object.

13. The system of claim 10 wherein the code module for selecting the third set of one or more information objects from the second set of information objects based upon the first set of relevancy scores and the second set of relevancy scores comprises:
- for each information object in the second set of information objects:
  - a code module for calculating an aggregate relevancy score for each information object in the second set of information objects by aggregating a relevancy score in the first set of relevancy scores generated for the information object by applying the first selection technique and a relevancy score in the second set of relevancy scores generated for the information object by applying the second selection technique; and
  - a code module for selecting an information object from the second set of information objects to be included in the third set of information objects if the aggregate relevancy score calculated for the information object is above a threshold value.

14. The method of claim 1 wherein applying the first selection technique to generate the first set of relevancy scores comprises:
- determining a first degree of relevancy between a first information object in the first set of information objects and a concept of interest to the user;
- determining a second degree of relevancy between a second information object in the second set of information objects and the concept of interest to the user; and
- determining, based on the first degree of relevancy and the second degree of relevancy, the relevancy of the second information object to the first information object as it relates to the concept of interest to the user.

15. The method of claim 1 wherein applying the second selection technique to generate the second set of relevancy scores comprises:
- determining a class of a first information object in the first set of information objects;
- determining a class of a second information object in the second set of information objects;
- determining, based on the class of the first information object and the class of the second information object, a comparison technique for comparing contents of the first and second information objects; and
- applying the comparison technique to determine the relevancy of the second information object to the first information object.

16. The method of claim 15 wherein the comparison technique is selected from a group consisting of: text comparison technique, image similarity comparison technique, sound similarity comparison technique, and video similarity comparison technique.

17. The method of claim 1 wherein the concepts of interest to the user are retrieved from a user profile associated with the user.

* * * * *